(12) United States Patent
Umezawa et al.

(10) Patent No.: US 7,991,897 B2
(45) Date of Patent: Aug. 2, 2011

(54) COMMUNICATION MANAGEMENT SYSTEM FOR PERFORMANCE DATA

(75) Inventors: Satoru Umezawa, Shizuoka-ken (JP); Motoaki Miyabe, Shizuoka-ken (JP)

(73) Assignee: Yamaha Corporation, Shizuoka-ken (JP)

( * ) Notice: Subject to any disclaimer, the term of this patent is extended or adjusted under 35 U.S.C. 154(b) by 793 days.

(21) Appl. No.: 11/389,595

(22) Filed: Mar. 24, 2006

(65) Prior Publication Data
US 2006/0218288 A1    Sep. 28, 2006

(30) Foreign Application Priority Data

Mar. 25, 2005   (JP) ................................. 2005-088427

(51) Int. Cl.
*G06F 15/16* (2006.01)
*G10H 1/02* (2006.01)
(52) U.S. Cl. ........................... 709/228; 370/236; 84/645
(58) Field of Classification Search .................. 370/230, 370/235, 236, 431, 433, 437–439, 462, 464, 370/465, 471, 496, 529; 84/645, 609, 610, 84/634, 649, 650; 709/227–229
See application file for complete search history.

(56) References Cited

U.S. PATENT DOCUMENTS

| | | | | |
|---|---|---|---|---|
| 5,616,879 A * | 4/1997 | Yamauchi et al. | ............... | 84/653 |
| 5,652,400 A * | 7/1997 | Fujimori et al. | ............... | 84/600 |
| 5,774,673 A * | 6/1998 | Beuk et al. | ................... | 709/236 |
| 6,259,701 B1 * | 7/2001 | Shur et al. | ..................... | 370/401 |
| 6,434,117 B1 * | 8/2002 | Momona | ....................... | 370/236 |
| 6,627,807 B2 | 9/2003 | Motoyama | | |
| 6,636,887 B1 * | 10/2003 | Augeri | .......................... | 709/203 |
| 6,700,050 B2 * | 3/2004 | Sakurada et al. | ............... | 84/615 |
| 7,240,093 B1 * | 7/2007 | Danieli et al. | ................ | 709/205 |
| 7,677,970 B2 * | 3/2010 | O'Kelley et al. | ............... | 463/25 |
| 2003/0167904 A1 * | 9/2003 | Itoh | ................. | 84/609 |
| 2005/0085296 A1 * | 4/2005 | Gelb et al. | ....................... | 463/31 |
| 2005/0120865 A1 * | 6/2005 | Tada | .............................. | 84/600 |

FOREIGN PATENT DOCUMENTS

| | | |
|---|---|---|
| EP | 1202490 | 5/2002 |
| EP | 1296312 | 3/2003 |
| JP | 10-257124 | 9/1998 |
| JP | 2004-301997 | 10/2004 |
| JP | 2004301997 | 10/2004 |

OTHER PUBLICATIONS

Xiaoyuan Gu et al: "NMP—a new networked music performance system" Global Telecommunications Conference Workshops, 2004. Globecom Workshops 2004. IEEE Dallas, TX, Nov. 29-Dec. 3, 2004, Piscataway, NJ, IEEE, Nov. 29, 2004, pp. 176-185.

(Continued)

*Primary Examiner* — Aung S Moe
*Assistant Examiner* — Curtis A Alia
(74) *Attorney, Agent, or Firm* — Harness, Dickey & Pierce, PLC

(57) ABSTRACT

In an effort to transmit/receive MDI data in a session among a plurality of terminals, when any of the terminals designates a communication partner and transmits a request to join a session to a management server 100, the management server allows the terminal to join a session joined by the designated communication partner, allocates a channel different from those allocated to the other terminals in the session, and notifies the allocated channel together with information on the terminals joining the session. Further, the terminal sets communication destinations based on the notification.

4 Claims, 21 Drawing Sheets

OTHER PUBLICATIONS

Sun Wei et al: "JMS: a flexible collaborative environment" Internet Workshop, 1999, IWS 99 Osaka, Japan Feb. 18-20, 1999, Piscataway, NJ, IEEE, pp. 195-202.

Eliens a et al: "Jamming (on) the Web" Computer Networks and ISDN Systems, North Holland Publishing, Amsterdam, NL. vol. 29, No. 8-13, Sep. 1997, pp. 897-903.

* cited by examiner

FIG. 3A

| GROUP MANAGEMENT TABLE | | | | |
|---|---|---|---|---|
| GROUP ID | TERMINAL ID | TERMINAL ID | ..... | |
| GRP#1 | ID#1 | ID#2 | ID#3 | ..... |
| GRP#2 | ID#4 | ID#5 | ..... | |
| ..... | | | | |

FIG. 3B

| TERMINAL MANAGEMENT TABLE | | | | |
|---|---|---|---|---|
| TERMINAL ID | COMMUNICATION PARTNER ID | INFORMATION ON SETTING IN SOUND SOURCE | CHANNEL NUMBER | GROUP ID |
| ID#1 | ID#2 | Prog#1 | CH#1 | GRP#1 |
| ID#2 | ID#1 | Prog#2 | CH#2 | GRP#2 |
| ⋮ | ⋮ | ⋮ | ⋮ | ⋮ |

| JOIN NOTIFICATION | OWN ID | COMMUNICATION PARTNER ID | INFORMATION ON SETTING IN SOUND SOURCE |

| STATUS NOTIFICATION | TERMINAL ID | CHANNEL NUMBER | INFORMATION ON SETTING IN SOUND SOURCE |

| LEAVE NOTIFICATION | OWN ID |

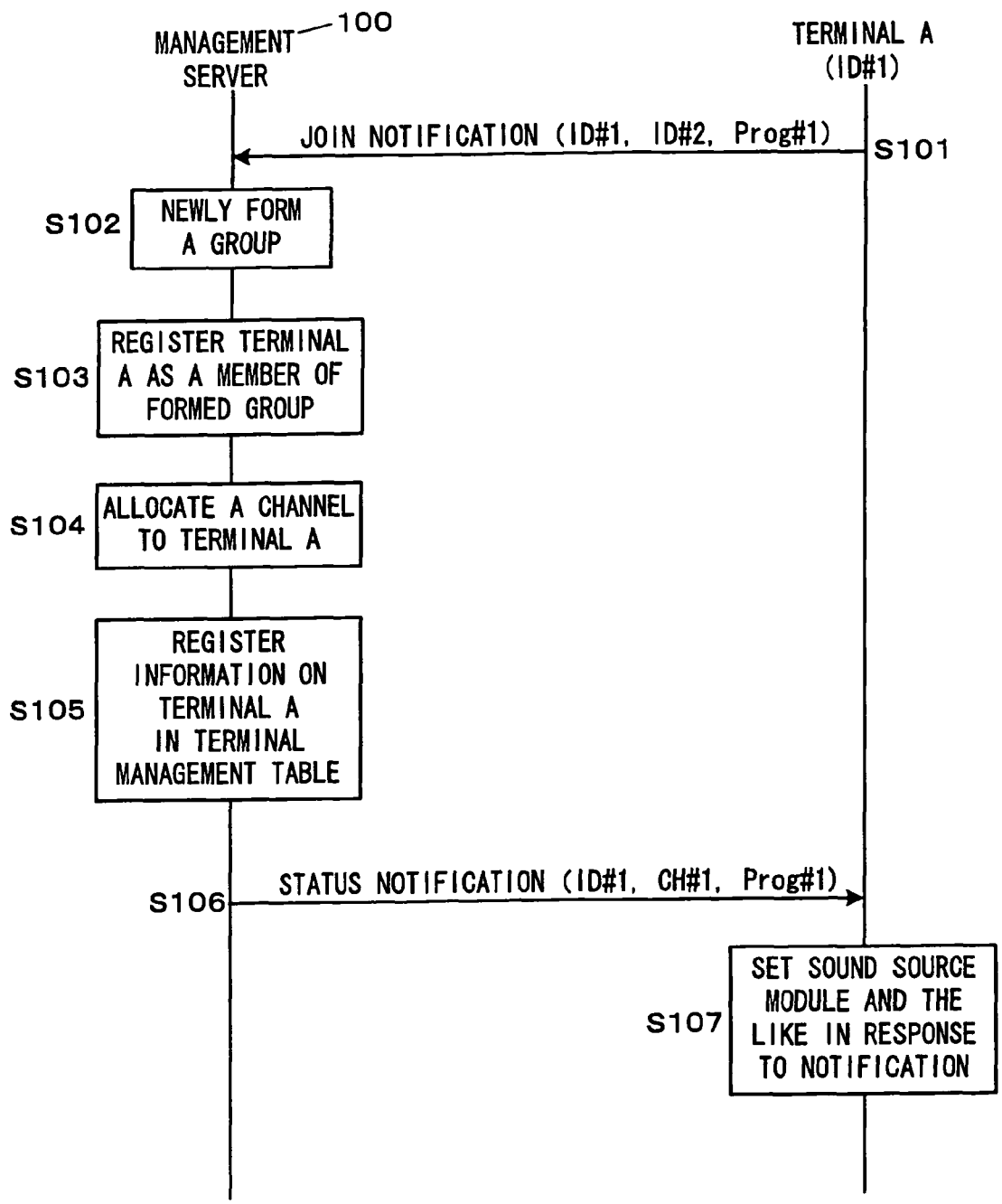

FIG. 13A

| GROUP MANAGEMENT TABLE |||||
|---|---|---|---|---|
| GROUP ID | TERMINAL ID | TERMINAL ID | | · · · · |
| GRP#1 | ID#1 | ← ADDED | | |

↑ NEWLY FORMED

FIG. 13B

| TERMINAL MANAGEMENT TABLE |||||
|---|---|---|---|---|
| TERMINAL ID | COMMUNICATION PARTNER ID | INFORMATION ON SETTING IN SOUND SOURCE | CHANNEL NUMBER | GROUP ID |
| ID#1 | ID#2 | Prog#1 | CH#1 | GRP#1 |

DATA RECEIVED FROM TERMINAL A — ALLOCATED DYNAMICALLY — COPIED FROM GROUP MANAGEMENT TABLE

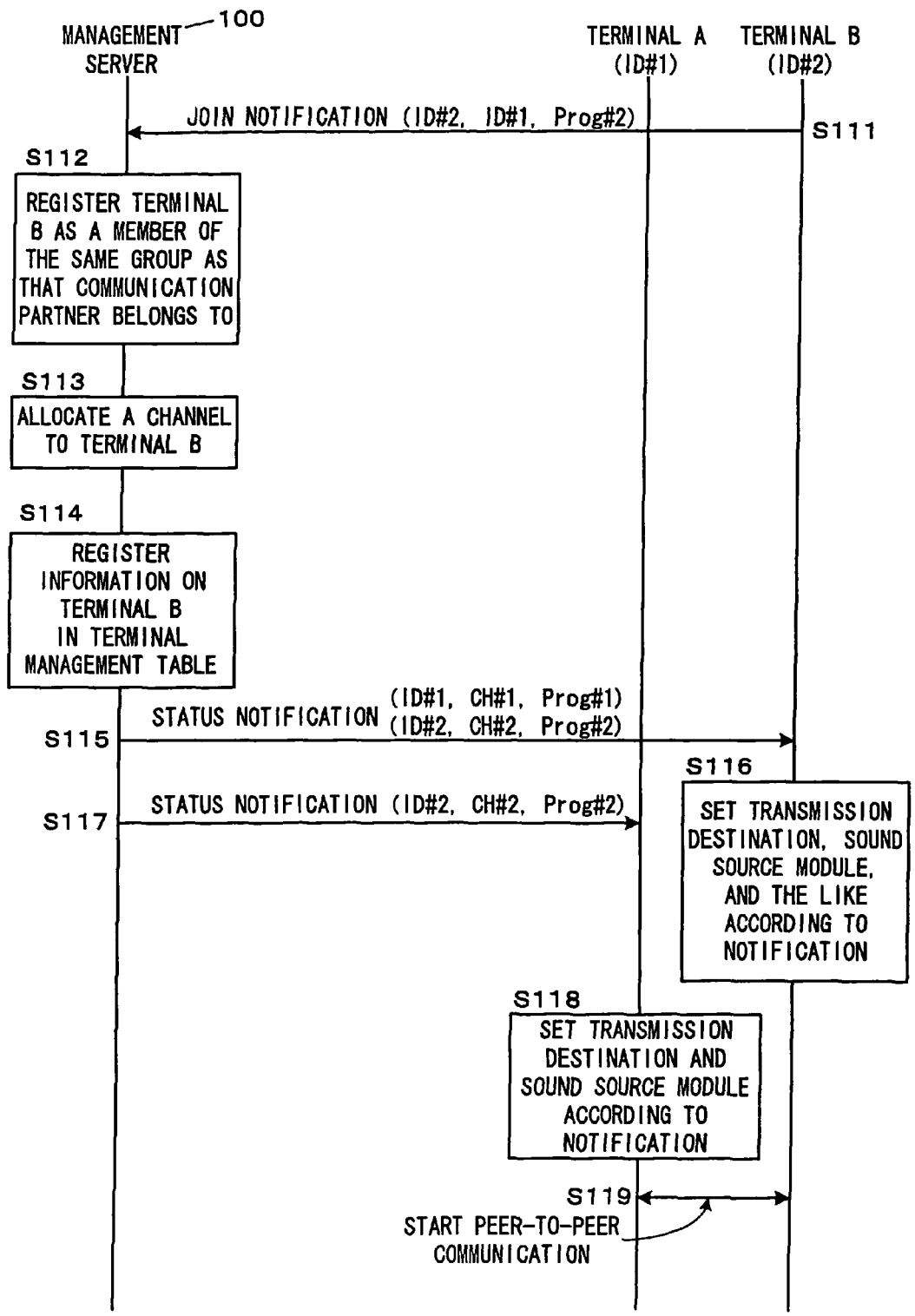

F I G. 1 5

| GROUP MANAGEMENT TABLE | | | |
|---|---|---|---|
| GROUP ID | TERMINAL ID | TERMINAL ID | · · · · |
| GRP#1 | ID#1 | ID#2 ← ADDED | |

REFERRING

| TERMINAL MANAGEMENT TABLE | | | | |
|---|---|---|---|---|
| TERMINAL ID | COMMUNICATION PARTNER ID | INFORMATION ON SETTING IN SOUND SOURCE | CHANNEL NUMBER | GROUP ID |
| ID#1 | IDxx | Prog#1 | CH#1 | GRP#1 |
| ID#2 | ID#1 | Prog#2 | CH#2 | GRP#1 |

REFERRING

FIG. 19
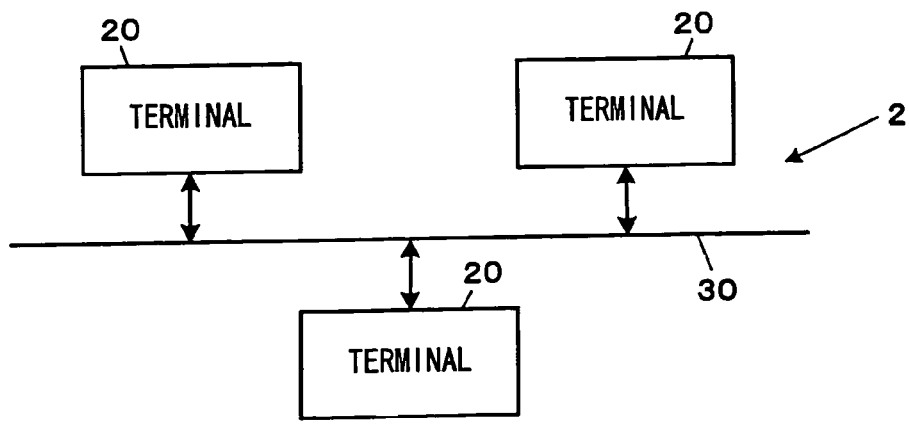
FIG. 20
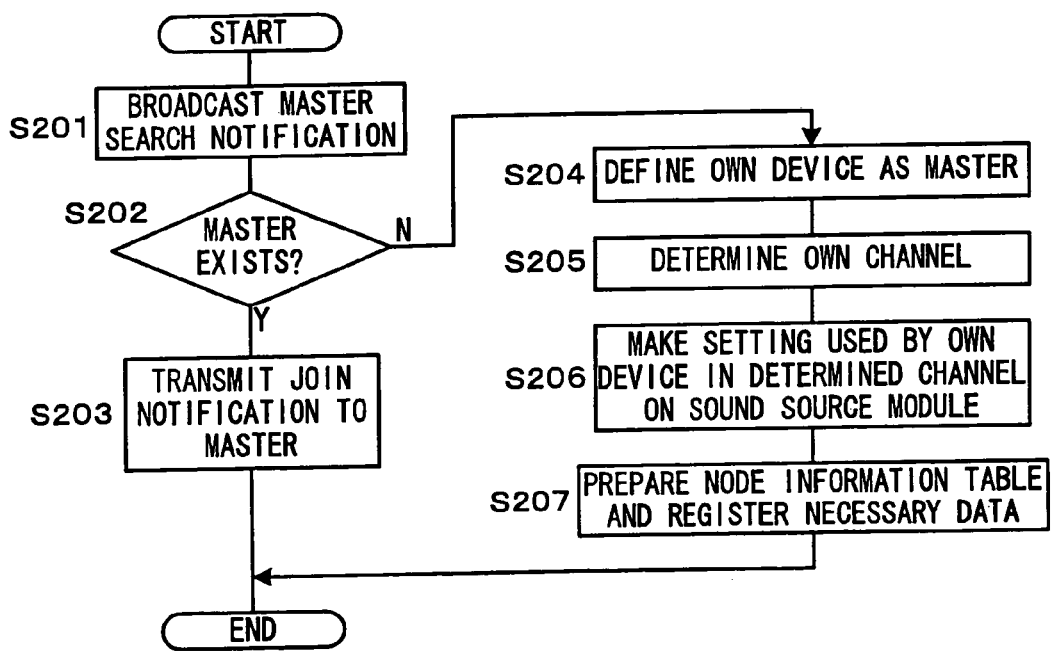
FIG. 21
| MASTER ID | ID#1 | |
|---|---|---|
| TERMINAL ID | CHANNEL NUMBER | INFORMATION ON SETTING IN SOUND SOURCE |
| ID#1 | CH#1 | Prog#1 |
| ID#2 | CH#2 | Prog#2 |

COMMUNICATION MANAGEMENT SYSTEM FOR PERFORMANCE DATA

BACKGROUND OF THE INVENTION

1. Field of the Invention

The invention relates to a communication management system for performance data including: a plurality of electronic musical apparatuses that transmit/receive performance data to/from one another; and a communication management device for performance data that manages the transmission/reception of the performance data among the plural electronic musical apparatuses, and to the communication management device for performance data included in the aforesaid system.

2. Description of the Related Art

Conventionally, there has been an art to connect, by cables, a plurality of devices dealing with performance data such as MIDI (Musical Instruments Digital Interface) data showing performance contents of a musical composition and allow these devices to transmit/receive the performance data to/from one another and cooperatively operate.

For example, for transferring the MIDI data, dedicated interfaces and cables have been conventionally used. However, in recent years, proposed is an art to transfer a MIDI message through other communication protocol, thereby realizing the transfer of a larger volume of data to a more distant place than in the conventional art where the dedicated interface is used. As such an art, the present assignee has proposed a communication protocol MLAN (registered trademark) that uses IEEE (Institute of Electrical and Electronic Engineers) 1394 as an interface.

Another proposed art uses, as a communication protocol, TCP (Transmission Control Protocol), UDP (User Datagram Protocol), and IP (Internet Protocol) to enable the transmission/reception of MIDI data via the Internet.

Such an art is described in, for example, Japanese Patent Application Laid-open No. 2004-301997. This document describes that in executing a session for exchanging MIDI data on the Internet, a connection server assigns and notifies IDs to respective terminals joining the session, and when transmitting the MIDI data, each of the terminals adds the channel number that is the same as the ID to the transmitted MIDI data.

SUMMARY OF THE INVENTION

However, the aforesaid communication protocol utilizing IEEE 1394 is a protocol that designates specific joining devices in advance to form a session group and allows only the joining devices to exchange MIDI messages, and thus has a problem that a device not designated cannot "drop in" to the session group.

The art described in Japanese Patent Application Laid-open No. 2004-301997 has a problem that users have to perform complicated operations in order to have their terminals join a session, for example, a user manually forms a group and thereafter a user of another terminal selects the group to request to join the group.

The invention was made to solve such problems, and it is an object thereof to enhance the degree of freedom in forming a session for data exchange when a plurality of devices transmit/receive performance data to/from one another and to make it possible for each device to join the session with a simple operation.

In order to achieve the objects stated above, the invention is a communication management system for performance data including: a plurality of electronic musical apparatuses transmitting/receiving performance data to/from one another; and a communication management device managing the transmission/reception of the performance data among the plural electronic musical apparatuses, wherein the communication management device includes: a memory that stores, as information on a session for the transmission/reception of the performance data, identification data of the electronic musical apparatuses joining the session; and a session information notifying device that, when the electronic musical apparatus designates a communication partner to request to join a session, allows the requesting electronic musical apparatus to join a session joined by the designated communication partner, allocates a channel different from channels allocated to the other electronic musical apparatuses in the session, and notifies the requesting electronic musical apparatus of the allocated channel together with the identification data of the electronic musical apparatuses joining the session and information on the channels used by the electronic musical apparatuses joining the session, and wherein each of the electronic musical apparatuses includes: a requesting device that designates a communication partner and transmits a request to join a session to the communication management device; a communicating device that sets a channel used by the own electronic musical apparatus, an address information of a device which is to be the communication partner, and an information on a channel used by the communication partner, based on data which are notified by the communication management device in response to the request, and transmits/receives performance data based on the setting.

Preferably, in such a communication management system for performance data, each of the electronic musical apparatuses includes a change notifying device that notifies both of the other electronic musical apparatuses joining the same session and the communication management device of contents of a change of a setting in an own sound source if the setting is changed while the own electronic musical apparatus is joining the session, and the communication management device stores, in the memory, information on settings in the sound sources used by the electronic musical apparatuses, in correspondence to the identification data of the electronic musical apparatuses, and when receiving the contents of the change of the setting in the sound source from the electronic musical apparatus, changes the information on the setting in the sound source stored in the memory based on the received contents.

A communication management device for performance data of the invention is a communication management device for performance data that manages transmission/reception of performance data among a plurality of electronic musical apparatuses, the device including: a memory that stores, as information on a session for the transmission/reception of the performance data, identification data of the electronic musical apparatuses joining the session; and a session information notifying device that, when the electronic musical apparatus designates a communication partner to request to join a session, allows the requesting electronic musical apparatus to join a session joined by the designated communication partner, allocates a channel different from channels allocated to the other electronic musical apparatuses in the session, and notifies the requesting electronic musical apparatus of the allocated channel together with the identification data of the electronic musical apparatuses joining the session and information on the channels used by the electronic musical apparatuses joining the session.

The above and other objects, features and advantages of the invention will be apparent from the following detailed description which is to be read in conjunction with the accompanying drawings.

BRIEF DESCRIPTION OF THE DRAWINGS

FIG. 3A and FIG. 3B are charts showing information that a management server shown in FIG. 1 stores for session management;

FIG. 12 is a chart showing an example of a processing sequence when a first terminal A transmits a join notification while no terminal is registered in the management server;

FIG. 13A and FIG. 13B are charts showing a state of a group management table and a state of a terminal management table respectively when the processing shown in FIG. 12 is completed;

FIG. 14 is a chart showing an example of a processing sequence when a next terminal B transmits a join notification indicating its intention to perform a session with the terminal A after the processing in FIG. 12;

FIG. 15 is a chart showing a state of the group management table and a state of the terminal management table respectively when the processing shown in FIG. 14 is completed;

FIG. 19 is a block diagram showing a schematic configuration of a second embodiment of a communication management system for performance data of the invention;

FIG. 20 is a flowchart of processing that a terminal shown in FIG. 19 executes when joining a session;

FIG. 21 is a chart showing an example of a node information table;

DETAILED DESCRIPTION OF THE PREFERRED EMBODIMENTS

Hereinafter, the best mode for carrying out the invention will be concretely described with reference to the drawings.

First Embodiment

FIG. 1 to FIG. 18

Figure 1:
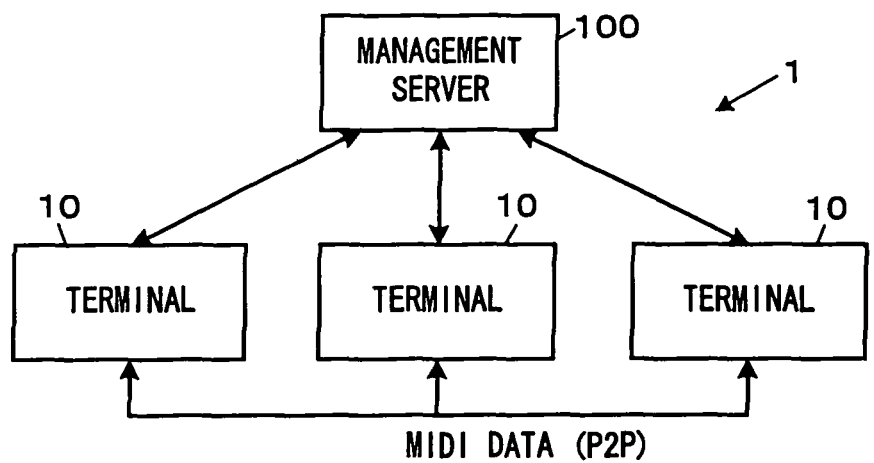
FIG. 1 is a block diagram showing a configuration of a first embodiment of a communication management system for performance data of the invention.

First, a first embodiment of a communication management system for performance data of the invention will be described. FIG. 1 is a block diagram showing a schematic configuration of the communication management system for performance data.

A communication management system 1 for performance data shown in FIG. 1 includes a management server 100 that manages a session for the transmission/reception of MIDI data being performance data when a plurality of terminals 10 transmit/receive the MIDI data to/from one another. Each of the terminals 10 corresponds to an electronic musical apparatus and the management server 100 corresponds to a communication management device for performance data.

The session here means that the plural terminals 10 transmit/receive (mutually exchange) MIDI data to/from communication partners in a specific group. By transmitting a request to the management server 100, each of the terminals 10 becomes a member of the group to join the session so that it comes to be capable of transmitting/receiving MIDI data to/from the terminals in the same group. Further, the management server 100 manages information on the members of the group performing the session. Further, in response to the request from the terminal 10, the management server 100 registers the requesting terminal 10 in the group, and when the members in the group change, it notifies necessary information to the members of the group, thereby enabling the members to normally perform the session.

The management server 100 is also capable of managing a plurality of sessions at the same time, and in this case, it manages information on members of a plurality of groups. Further, on the terminal 10 side, the terminal 10 does not transmit/receive MDI data to/from terminals belonging to a different group even if they are terminals communicating with the same management server 100, and transmits/receives MIDI data to/from only the terminals belonging to the same group.

In the communication management system 1 for performance data, the transmission/reception of MIDI data is basically peer-to-peer (P2P) communication among the terminals 10 and is not communication via the management server 100.

"Peer-to-peer" here is a usage form of a communication network (typically the Internet) where data are exchanged directly among terminals (individuals). In the invention of this application, a communication protocol for the peer-topeer communication is not limited to a specific one, but for the transfer of MIDI data, a communication protocol is desirably one in which a timestamp, synchronizing clocks, and the like for maintaining isochrony of data are defined. Further, different protocols may be used according to types of data exchanged among the terminals.

Figure 2:
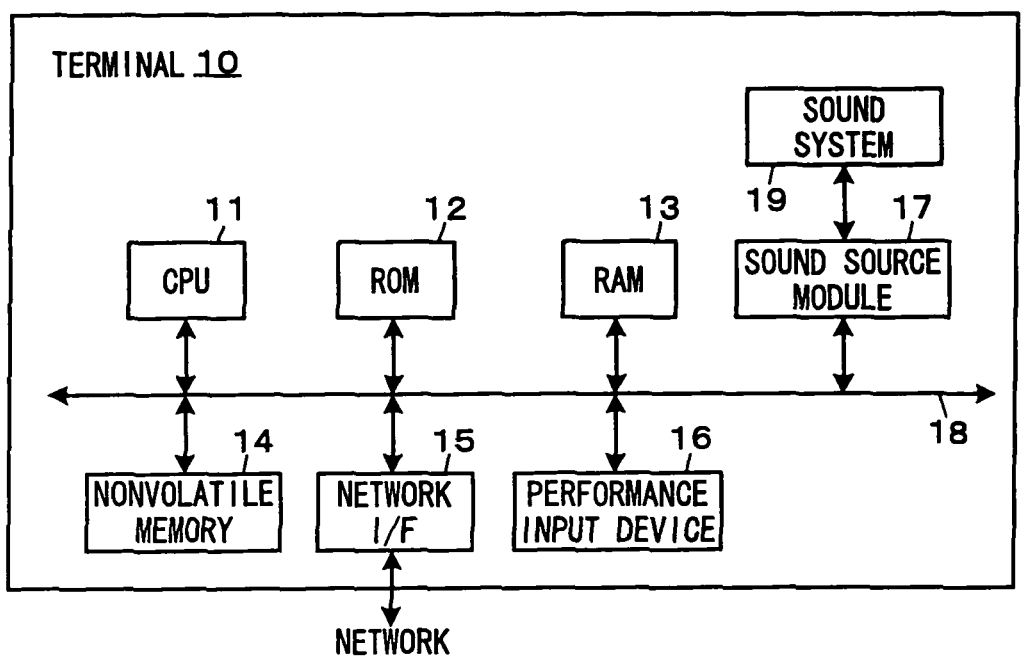
FIG. 2 is a diagram showing a hardware configuration of a terminal shown in FIG. 1.

Next, FIG. 2 shows a hardware configuration of the terminal 10 shown in FIG. 1.

As shown in FIG. 2, the terminal 10 includes a CPU 11, a ROM 12, a RAM 13, a nonvolatile memory 14, a network interface (I/F) 15, a performance input device 16, and a sound source module 17, and they are connected to a system bus 18. The terminal 10 further includes a sound system 19 connected to the sound source module 17.

The CPU 11, which is a controller centrally controls the terminal 10, executes necessary control program stored in the ROM 12 to perform control operations for controlling data read/write from/to the nonvolatile memory 14, communication via the network I/F 15, detection of a performance input operation via the performance input device 16, generation of waveform data by the sound source module 17 based on the MIDI data, and so on.

The ROM 12 is a memory storing the control programs executed by the CPU 11, data requiring no change, and the like. The ROM 12 may be constituted of a rewritable nonvolatile memory such as a flash memory so that these data can be updated.

The RAM 13 is a memory used as a work memory of the CPU 11, storing, in a storage area thereof, parameter values which are used by the sound source module 17, in processing of MIDI data (generation of the waveform data), and storing other temporarily used data.

The nonvolatile memory 14, which is a nonvolatile storage device constituted of a nonvolatile RAM, HDD (hard disk drive), or the like, stores data having a relatively large volume and required to be held even without power, such as the control programs executed by the CPU 11 and MIDI music data for automatic performance.

The network I/F 15 is an interface for communication with the management server 100 and the other terminals 10 via a network such as a LAN (Local Area Network) or the Internet, and may be an interface for Ethernet (registered trademark) communication, for instance. However, a communication pathway used by the terminal 10 is not limited to this, and an appropriate interface is prepared as the network I/F 15 according to a protocol of the communication pathway, a communication protocol in use, or the like. Further, the communication I/F 15 may of course be provided in plurality in correspondence to a plurality of protocols.

The performance input device 16 is a device such as a keyboard, strings, a pad, or a mouthpiece, for receiving operations for performance, and a user's operation of the performance input device 16 is converted by a detection circuit having various kinds of sensors to an electrical signal, which is then transmitted to the CPU 11. Then, based on this signal, the CPU 11 generates MIDI events for instructing the sound source module 17 to generate sound according to the user's performance operation and transmits the MIDI events to the sound source module 17. Further, if another terminal is set as a communication partner of the terminal 10, the CPU 11 transmits the same MIDI events to the terminal.

The sound source module 17 is a sound source compatible to GM (General MIDI) and is a sound source device that generates waveform data, which is a digital audio signal, in a plurality of sound generation channels based on the MIDI events sent from the CPU 11. The MIDI events include not only the data instructing the start and stop of the sound generation but also data instructing a change of a setting regarding the contents of the sound generation such as tone color. The MIDI events include not only those generated by the CPU 11 but also those received from the other terminals 10. As will be described later, the MIDI events generated by the CPU and the MIDI events received from the other terminals 10 are made distinguishable by channels and the contents of the sound generation are appropriately set in each channel, so that the sound source module 17 can generate the waveform data which as a whole is data for an ensemble played by the plural terminals 10.

The sound system 19 is a sound generator such as a speaker and has a function of generating sound according to the waveform data supplied from the sound source module 17.

Concrete examples of the terminal 10 as structured above are typically a keyboard, an electronic organ, and an electronic piano, and are other electronic musical instruments including percussions, strings, and winds, and the like. Other possible examples are devices without any musical operation device such as a MIDI sequencer and a PC (Personal Computer) implemented with an application for realizing functions of a MIDI sequencer. Further, portable terminals such as a cellular phone and a PDA (Personal Digital Assistance) can also function as the terminal 10, providing that they have the functions dealing with the MIDI data.

The terminal 10 only needs to have either the function of transmitting the MIDI data or the function of receiving the MIDI data and does not necessarily need to have both the transmitting function and the receiving function. Further, the sound source module 17 and the sound system 19 are not essential.

As hardware of the management server 100, usable is a known computer having a CPU, a ROM, a RAM, a HDD, a network I/F, and the like. Since functions of these components are the same as those of the corresponding components in the above-described terminal 10, detailed description thereof will be omitted. Further, the management server 100 preferably includes a high-performance CPU and a large-capacity HDD, but this is not restrictive. Further, one of the terminals 10 may function as the management server 100.

Next, FIG. 3A and FIG. 3B show examples of information that the management server 100 stores for session management.

As shown in these drawings, the management server 100 stores, in a memory such as a HDD or a RAM, a group management table and a terminal management table as the information for session management.

The former is a table for managing information on groups performing sessions under the management of the management server 100. In this table, information on members of each group, namely, terminals joining the session, is registered by IDs of these terminals, in correspondence to an ID of each group. Here, the group ID is data used only inside the management server 100. The number of the terminals 10 admitted as members of one group is not specifically limited, but in the general MIDI, the number of usable channels is 16, and accordingly the number of the terminals 10 is preferably limited to 16.

The latter is a table for managing information on the terminals 10 performing the session under the management of the management server 100. In this table, an ID of a communication partner that the terminal 10 designated when requesting to join the session, information on a setting in a sound source used by the terminal, the channel number allocated to the terminal, and the ID of the group to which the terminal belongs are registered in correspondence to the ID of each of the terminals 10.

Note that, when no session is performed under the management of the management server 100, no information is registered in either of the tables.

Further, in the tables shown in FIG. 3A and FIG. 3B, information for identifying each of the terminals itself such as the product number or the registration number may be used as the ID of the terminal, but it is preferable to use address information such as an IP address used for communication with the relevant terminal. This respect will be described in detail later.

As for the information on the setting in the sound source, for example, information on tone color set according to a MIDI program change event may be registered as the program number, but this is not restrictive. Information on a plurality of items may be registered.

Figure 4:
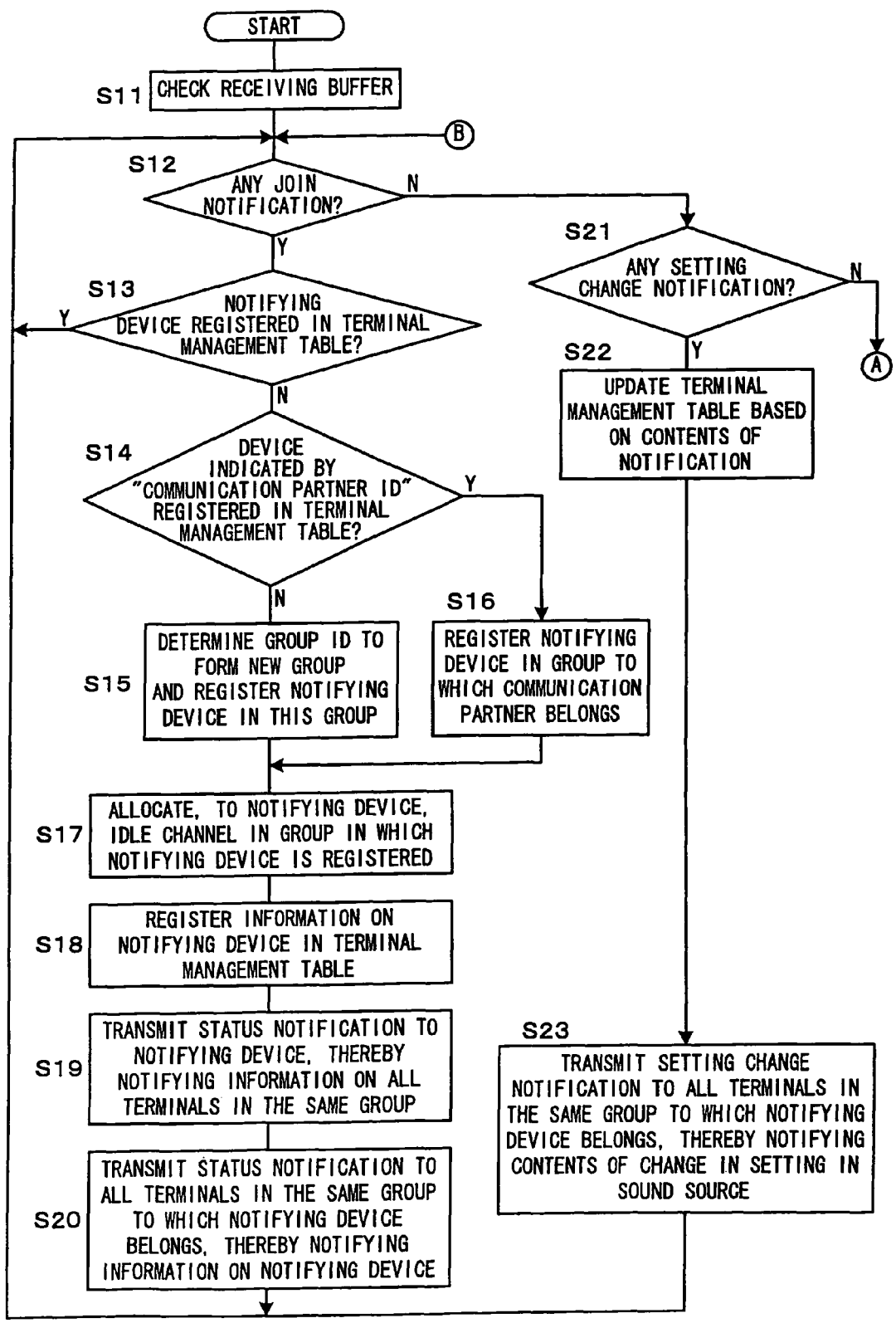
FIG. 4 is a flowchart of a part of processing for received data executed by the management server shown in FIG. 1.
Figure 5:
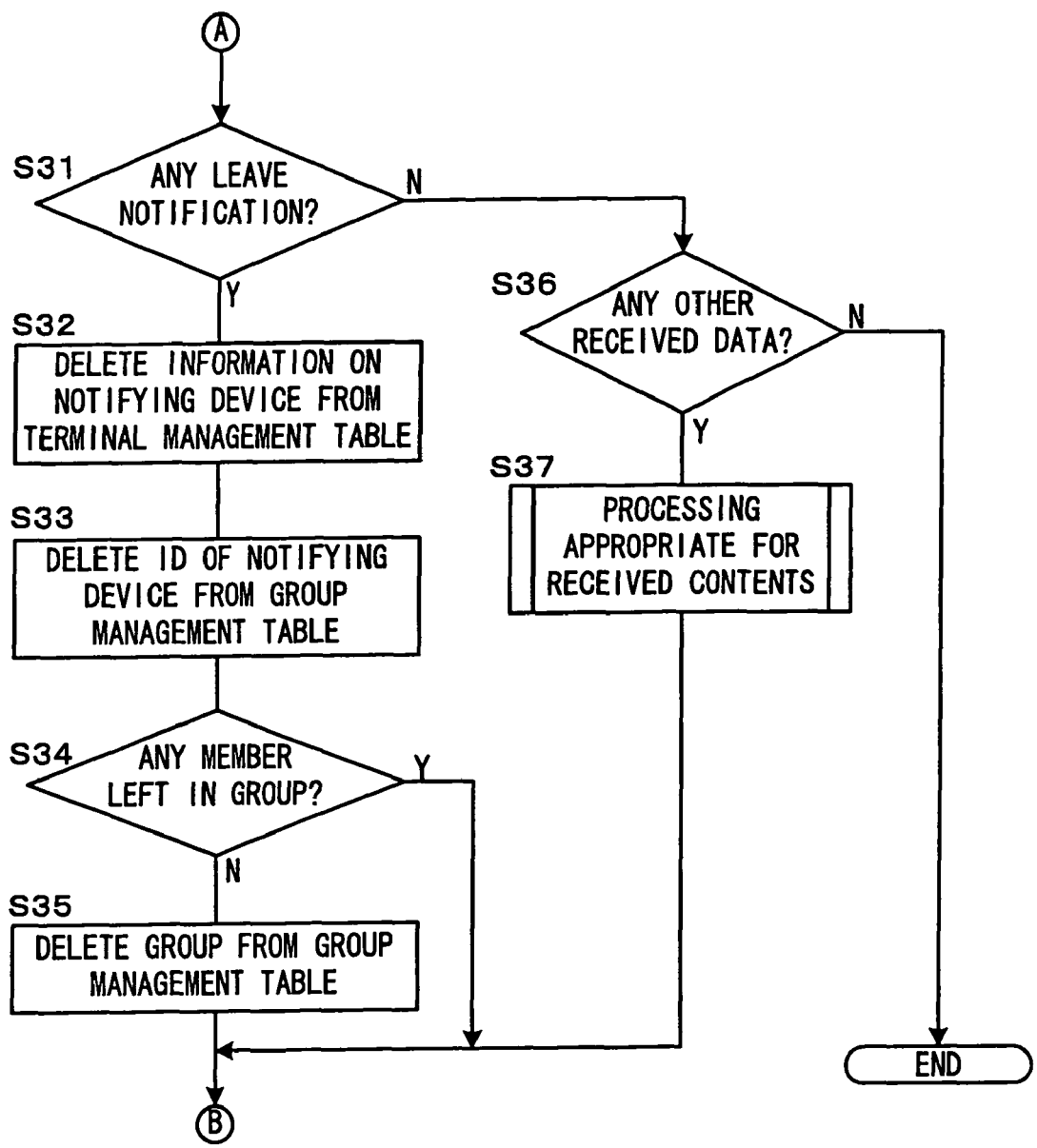
FIG. 5 is a flowchart of processing continuing from FIG. 4.

Next, FIG. 4 and FIG. 5 show flowcharts of processing for received data executed by the CPU of the above-described management server 100, focusing on a part corresponding to processing for session management. Note that the CPU of either of the devices realizes the processing described below by executing a necessary control program, unless otherwise noted.

The CPU of the management server 100 temporarily stores, in a receiving buffer, data received from an external device such as the terminal 10 and executes the processing shown in the flowcharts in FIG. 4 and FIG. 5 at a regular timing to thereby execute processing appropriate for the received data.

In this processing, the receiving buffer is first checked (S11). Then, if a join notification is found (S12), processing in accordance with the join notification at Steps S13 to S20 is executed.

Figures 6, 7, 8, 9:
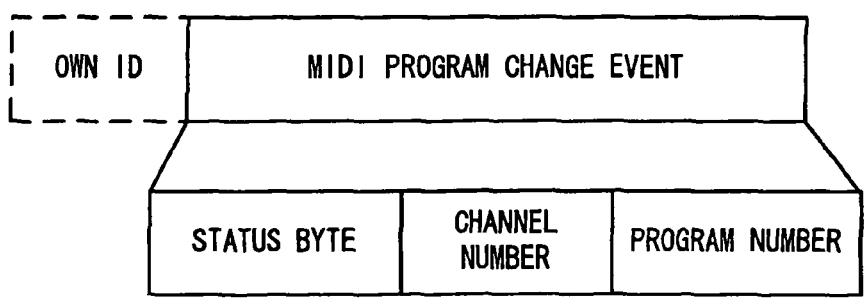
FIG. 6 is a chart showing a data structure of a join notification.
FIG. 7 is a chart showing a data structure of a status notification.
FIG. 8 is a chart showing a data structure of a setting change notification.
FIG. 9 is a chart showing a data structure of a leave notification.

Here, FIG. 6 shows a data structure of the join notification.

The join notification is a notification that the terminal 10 transmits to the management server 100 when requesting to join a session, and as shown in FIG. 6, it includes information indicating that this notification is the join notification, an ID (own ID) of a device transmitting the notification (notifying device), an ID of a communication partner that the terminal 10 wants to communicate with, and information on a setting in a sound source in the notifying device.

Incidentally, when information transfer by the terminal 10 to the management server 100 is packet transfer, the information indicating the join notification may be written in a packet, but also possible is to use an ID of the packet. Further, as the own ID, usable is data on a packet transmitting device ID appended to the packet. When an IP address is used as the ID, an IP address of the packet transmitting device can be used.

Further, the information on the setting in the sound source is information on part of the setting contents that is necessary for the sound source module 17 to generate sound according to the MIDI event transmitted by the notifying device in the session (here the contents of the setting for one channel), and does not necessarily include all the contents of the setting in the sound source of the notifying device.

Returning to the description of FIG. 4, in the above-described processing for the join notification, first, if the notifying device has already been registered in the terminal management table, the flow directly returns to Step S12 (S13). In this case, since the notifying device is likely to have joined some session, this processing is executed in order to prevent the same device from being permitted again to join another session. This judgment may be made based on whether or not the notifying device has already been registered in the group management table.

Then, if the notifying device has not been registered, it is next judged whether or not a device indicated by "communication partner ID" has been registered in the terminal management table (or group management table) (S14). If NO, the session with this device is not possible under the current status. Therefore, a new group is formed, and the notifying device is registered in the group (S15) and is made to wait until the communication partner requests to join the session. To put it other way around, a new group, if desired, can be formed by writing an ID of a dummy communication partner in the join notification. An ID of the new group can be determined by an appropriate method such as by using the serial number or the random number. On the other hand, if YES at S14, the notifying device is registered in the group to which the communication partner belongs (S16). In either case, for registering the notifying device, its ID is registered in the group information table.

Then, in either case, an idle channel (CH) in the group in which the notifying device is registered is allocated to the notifying device (S17) and information on the notifying device is registered in the terminal management table (S18). As information on the channel and the group, those determined at Step S15 to S17 are registered. An arbitrary method may be used for the channel allocation, but a possible example of the method is to list channels allocated to the terminals in the same group by referring to the terminal management table and select a channel at random from channels other than the listed channels. Any method may be used providing that it can uniquely allocate a channel and does not allocate the same channel to the plural terminals in the same group.

Thereafter, a status notification is transmitted to the notifying device, whereby information on all the terminals in the same group is notified thereto (S19) and a status notification is also transmitted to all the terminals in the same group (except the notifying device) to which the notifying device is to belong, whereby the information on the notifying device is notified (S20).

Thereafter, the flow returns to Step S12 and the processing is repeated, and if another data is found in the receiving buffer, the processing in accordance with this data is executed.

Note that in the above-described processing at Steps S13 to S20, the CPU of the management server 100 functions as a session information notifying device.

Here, FIG. 7 shows a data structure of the status notification.

As shown in FIG. 7, the status notification is a notification that the management server 100 transmits to the terminal 10 in order to notify the information on the terminals 10 joining the session and includes information indicating that this notification is the status notification, information indicating a terminal whose status is notified by this status notification (terminal ID), the channel number allocated to this device, and the information on the setting in the sound source in this device.

This status notification can be prepared based on the information registered in the terminal management table. Further, when the status notification that notifies information on the plural devices is transmitted (mainly Step S19), the status notifications for the respective devices may be transmitted, or the single status notification may include the information on the plural devices. The terminal 10 side makes the setting in the sound source based on the information included in the status notification.

Further, similarly to the above-described case of the join notification, an ID of a packet may be used to indicate that this notification is the status notification and all the contents of the setting need not be included as the contents of the setting in the sound source.

Returning to the description of FIG. 4 again, if no join notification is found at Step S12, the flow goes to Step S21, and if there is a setting change notification here, processing in accordance with the setting change notification at Steps S22 and S23 is executed.

If the terminal 10 changes the setting (the part notified to the management server 100 by the join notification) in its own sound source, the contents thereof are notified to the management server 100 by the setting change notification. Then, when receiving the notification, the management server 100 updates the information in the terminal management table based on the contents of the notification (S22) and transmits the setting change notification to all the terminals in the same group to which the notifying device belongs, thereby notifying the contents of the change of the setting in the sound source (S23).

Thereafter, the flow returns to Step S12 and the processing is repeated, and if another data is found in the receiving buffer, the processing in accordance with this data is executed.

Here, FIG. 8 shows a data structure of the setting change notification.

As shown in FIG. 8, the setting change notification is a MIDI event indicating the contents of the change of the setting, and is a MIDI program change event here. When transmitting the setting change notification to the management server 100, the terminal 10 appends the ID of the transmitting device of the notification (own ID) thereto. Similarly to the above-described case of the join notification, data on the ID of a packet transmitting device appended to a packet may be used as the own ID.

The MIDI program change event includes a status byte indicating that this MIDI data is the MIDI program change event, the channel number indicating a channel whose setting is changed, and information on the program number indicating the contents of the setting to be newly applied to the channel.

The MIDI program change event is a kind of the MDI event and the management server 100 does not intervene in the transmission/reception thereof among the terminals joining the same session. Therefore, even without the involvement of the management server 100, each of the terminals can make an appropriate setting in the sound source module according to the MIDI program change event received from the other terminal.

However, if the contents of the MIDI program change event are transmitted also to the management server 100 and the management server 100 notifies the contents thereof to the terminals in the same group to which the notification transmitting device belongs as shown here, redundancy of the data increases. Accordingly, even when some trouble occurs either in the transfer among the terminals or in the transfer from the management server 100 to the terminals, it is possible to make an appropriate setting in the sound source module by utilizing the data transferred through the other route. Moreover, it is also possible for the management server 100 side to keep track of the contents of the settings in the sound sources in the terminals and to notify, by the status notification transmitted at Step S19, the status of the settings in the sound source modules 17 in the other terminals in the group, to the terminal newly joining the session so that the newly joining terminal can make an appropriate setting.

It goes without saying that events other than the MIDI program change event, for example, a MIDI control change event, may be transmitted/received as the above-described setting change notification, providing that it is information regarding the setting in the sound source.

Returning to the description of FIG. 4 again, if no setting change notification is found at Step S21, the flow goes to Step S31 in FIG. 5, and if any leave notification is found here, processing in accordance with the leave notification at Steps S32 to S35 is executed.

The leave notification is a notification by which the terminal 10 notifies the management server 100 of its intention to leave the session. Then, when receiving this notification, the management server 100 deletes the information on the notifying device from the terminal management table and the group management table (S32, S33). Consequently, the channel allocation to the notifying device is also cancelled, so that this channel can be allocated to another device. Then, if no member is left in the group as a result of the deletion, the group itself is also deleted from the group management table (S34, S35).

Thereafter, the flow returns to Step S12 in FIG. 4 and the processing is repeated. If another data is found in the receiving buffer, the processing in accordance with this data is executed.

Here, FIG. 9 shows a data structure of the leave notification.

As shown in FIG. 9, the leave notification includes information indicating that this notification is the leave notification and the ID of the notifying device, and does not need to include any other special information. Further, as in the above-described case of the join notification, the ID of a packet or the ID of a packet transmitting device can be used as this data.

Note that the terminal 10 transmitting the leave notification can leave the session by terminating the transmission/reception of MIDI data to/from the other terminals thereafter. Further, if a communication error occurs in the transmission/reception of MIDI data because the terminal leaving the session stops responding from a certain moment, it can be recognized that this terminal has left the session. Since MIDI data for the channel allocated to the terminal that has left the session is no longer transmitted, there is no special problem even if the contents of the setting of this channel are not changed.

Therefore, there is no need for the management server 100 to particularly notify the leave to the terminals in the same group to which the device transmitting the leave notification belongs. The reason why the terminal 10 transmits the leave notification to the management server 100 is to keep the contents of the group management table and the terminal management table consistent with the current status of the session.

Returning to the description of FIG. 5, if no setting change notification is found at Step S31, the flow goes to Step S36. If another data is found here, processing in accordance with the contents thereof is executed (S37), and the flow returns to Step S 12 in FIG. 4. On the other hand, if no other data is found, it means that the processing for all the data in the receiving buffer has been completed, and therefore, the processing of the flowchart is ended.

The management server 100 executes the processing as described above, so that by referring to the group management table and the terminal management table, it can keep track of the status of the session performed by the terminals and the contents of the settings in the sound sources in the terminals, and can notify the information on these to the terminals when necessary.

Figure 10:
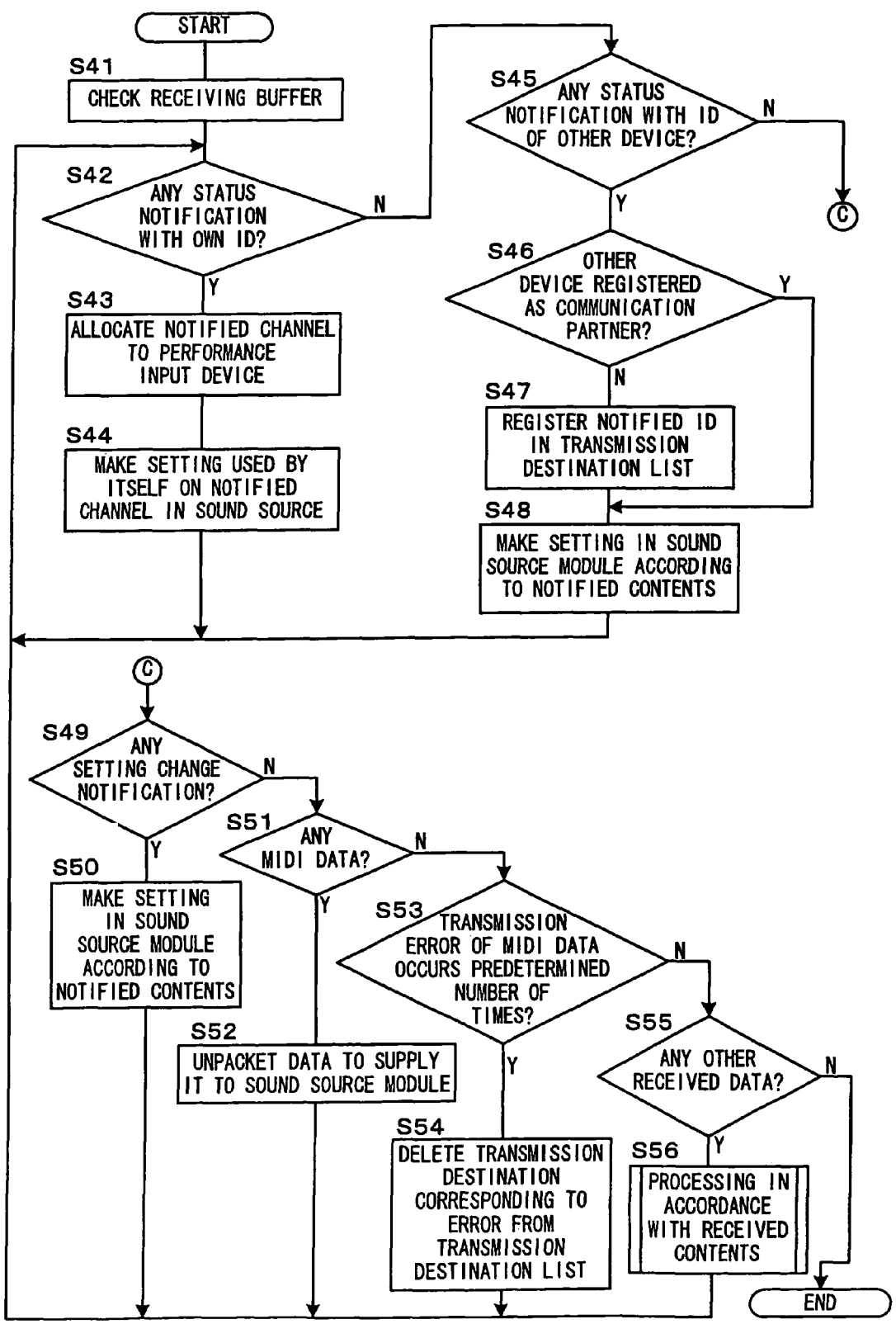
FIG. 10 is a flowchart of processing for received data executed by the terminal shown in FIG. 1.

Next, FIG. 10 shows a flowchart of processing for received data executed by the terminal 10, focusing on a part corresponding to the processing for the execution of the session.

The terminal 10 also temporarily stores, in a receiving buffer, data received from the management server 100 and external devices such as the other terminals, and executes the processing shown in the flowchart in FIG. 10 at a regular timing to execute processing appropriate for the data.

Then, in this processing, the receiving buffer is first checked (S41). Then, if a status notification including the own ID as the terminal ID is found (S42), it is known that the management server 100 notifies by this notification a channel allocated to the terminal 10. Then, the channel notified by the status notification is allocated to the performance input device 16 (S43). That is, the channel number appended to the MIDI event that is generated by the CPU 11 according to the operation of the performance input device 16 is set to the channel number allocated by the management server 100. Then, a setting for use by itself is made in the notified channel in the sound source module 17 (S44). This setting corresponds to the contents notified to the management server 100 when the join notification is transmitted. Then, by setting, for example, tone color, it is possible for the sound source module 17 to generate sound with desired tone color in response to the operation of the performance input device 16.

After Step S44, the flow returns to Step S42, and the processing is repeated. If another data is found in the receiving buffer, the processing in accordance with this data is executed.

On the other hand, if no status notification including the own ID is found at Step S42, the flow goes to Step S45. Then, if a status notification including the ID of the other terminal as the terminal ID is found, it is known that the management server 100 notifies by this notification a channel allocated to another terminal joining the same session (or newly joining the same session) and the contents of the setting in the sound source regarding this channel. Then, the terminal is registered in the transmission destination list if not yet registered therein, (S46, S47). In either case, according to the contents of the notification, the notified contents are set on the notified channel in the sound source module 17 (S48). The flow thereafter returns to Step S42, and the processing is repeated.

Note that the aforesaid transmission destination list is a list in which terminals joining the same session and being transmission destinations of the transmitted MIDI data are registered, and address information such as IP addresses used at data transmission is registered therein. When the address information is used as the ID of the device, the address information can be registered as it is, but in other cases, the address information is obtained by some means. An example of the way the address information is obtained is such that the management server 100 stores the correspondence relation between the ID and the address information, and each of the terminals 10 sends an inquiry to the management server 100 at the time of the registration in the transmission destination list. However, processing in this case is complicated and requires more or less additional time. Therefore, in this viewpoint, the address information such as the IP address is preferably used as the ID of each of the terminals. Further, the information registered in the transmission destination list need not be information indicating the address itself, but any information is called as the address information, providing that this information can serve as a key to obtain an address necessary for the transmission of data.

Further, since it is preconditioned that the management server 100 has transmitted the same status notification to the terminals joining the same session, the same contents can be set in the sound source modules 17 of the terminals if the terminals make the setting in the sound source modules 17 according to the status notification. Consequently, all the terminals joining the session can generate the same sound in response to a MIDI event from the same terminal. If this uniformity is not maintained, that is, for example, if tone color set on each channel is different depending on each terminal, each transmission destination generates different sound for the same MIDI event, which is extremely inconvenient for use in an ensemble utilizing the session. However, in this system, such a problem can be avoided.

On the other hand, if there is no status notification including the ID of any of the other devices at Step S45, the flow goes to Step S49. Then, if any setting change notification is found, the setting is made in the sound source module 17 according to the contents thereof (S50). As described in the description of the management server 100 side, since this notification is the same as that received as the MIDI event from the terminal joining the same session, it is not essential to newly change the setting here, but the processing is intentionally made redundant so as to ensure the setting change.

If there is no setting change notification at Step S49, the flow goes to Step S51. Then, if MIDI data is found, the data is unpacketed to be supplied to the sound source module 17 (S52). The MIDI data includes that instructing the start or end of sound generation and that instructing a change of the setting in the sound source module 17.

If no MIDI data is found at Step S51, the flow goes to Step S53. Then, if a transmission error occurs in the transmission of the MIDI data to a specific transmission destination a predetermined number of times, the transmission destination corresponding to the error is deleted from the transmission destination list (S54). If some terminal leaves the session, an error is expected to occur in the transmission of the MIDI data to this terminal. Therefore, in such a case, the communication with this terminal is stopped. The reason for defining a predetermined number of times of the error. occurrences as a basis of stopping the communication is to prevent an accidental occurrence of an error from being considered as the leave from the session.

Returning to the description of FIG. 10, if no transmission error is found at Step S53, the flow goes to Step S55, and if another data is found here, processing in accordance with the contents thereof is executed (S55, S56). On the other hand, if no other data is found, it means that the processing for all the data in the receiving buffer has been completed, and therefore, the processing in the flowchart is ended.

After Steps S50, S52, S54, and S56, the flow returns to Step S42, and the processing is repeated.

Figure 11:
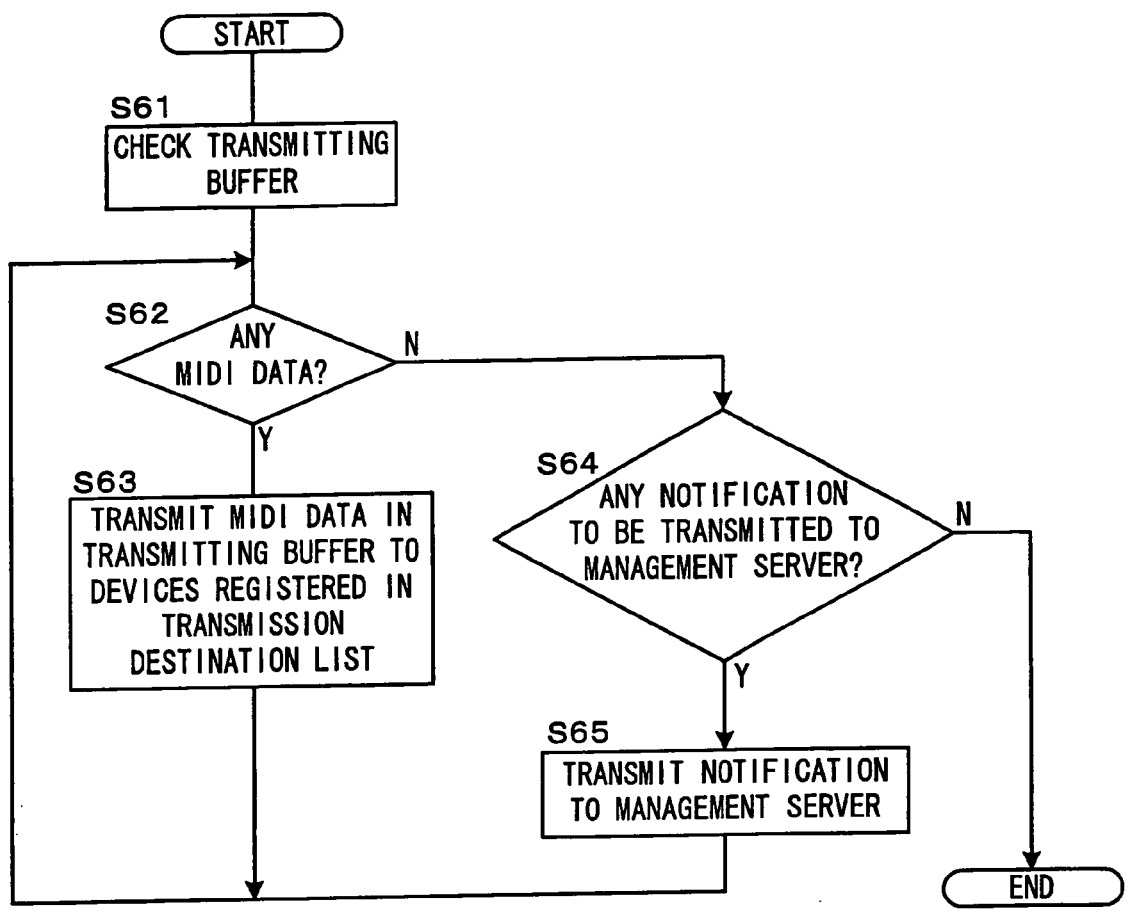
FIG. 11 is a flowchart of processing for data transmission executed by the terminal shown in FIG. 1.

Next, FIG. 11 shows a flowchart of processing for data transmission executed by the terminal 10, focusing on a part corresponding to processing for the execution of the session.

The terminal 10 temporarily stores, in a transmitting buffer, the MIDI data generated in response to the operation of the performance input device 16, notifications to be transmitted to the management server 100, and the like, and executes the processing shown in the flowchart in FIG. 11 at a regular timing to transmit these data.

Note that the notifications transmitted to the management server 100 include the join notification, the setting change notification, the leave notification, and so on. Among them, the join notification is generated based on the following information: namely, the ID of a communication partner which is determined by an operation of a not-shown control or the like; and the setting contents (tone color number and the like) which are to be used in generating sound based on MIDI data generated by the terminal itself 10, when the ID of the communication partner is determined and the start of the session is instructed.

A possible way of generating the setting change notification is to monitor the contents of the setting on the channel allocated to itself in the sound source module 17 and generate a notification indicating a change of the contents, if any, or to monitor the contents of MIDI data written in the transmitting buffer and duplicate the MIDI data as packet data addressed to the management server 100 if a MIDI data regarding the change of the contents of the setting in the sound source module 17 such as a program change is found. When the CPU 11 generates MIDI data regarding the change of the contents of the setting, the packet data addressed to the management server 100 may be generated at the same time.

The leave notification is generated when the end of the session is instructed by an operation of a not-shown control or the like.

Then, in the processing shown in FIG. 11, the transmitting buffer is first checked (S61). Then, if MIDI data is found, this MIDI data is directly transmitted on a peer-to-peer basis to the devices registered in the transmission list, namely, all the terminals joining the same session (S62, S63). On the other hand, if no MIDI data is found and there is some notification to be transmitted to the management server 100, this notification is transmitted to the management server 100 (S64, S65). Then, in either case, the flow returns to Step S62, and the processing is repeated. If any other data is found in the transmitting buffer, the processing in accordance with this data is executed. If there is no notification at Step S64, it means that the processing for all the data in the transmitting buffer has been completed, and therefore, the processing in the flowchart is ended.

By executing the above-described processing shown in FIG. 10 and FIG. 11, the terminal 10 is capable of notifying the management server 100 of the request to join the session, and is capable of setting the channel used by itself, the address information of the device to be the communication partner, and the information on the channel used by the communication partner, based on the data obtained from the management server 100 to transmit/receive the MIDI data based on these settings.

Next, using FIG. 12 to FIG. 18, an example of an operation sequence of the management server 100 and the terminal 10 which are realized by executing the above-described processing will be described. Note that in the description of these drawings, different terminals are denoted by reference symbols with A, B, and C in order to discriminate the plural terminals from one another.

First, FIG. 12 shows an example of a processing sequence when a first terminal (terminal A) transmits the join notification while no terminal is registered in the management server 100.

In this case, the terminal A (its ID is "ID#1") transmits to the management server 100 the join notification including ID#1 as the own ID, ID#2 (ID of a terminal B) as a communication partner ID, and Prog#1 as the information on the setting in the sound source (S101).

Then, the management server 100 receiving the join notification executes the processing at and after Step S13 in FIG. 4 to newly form a group (its ID is "GRP#1") (S102) since the device with ID#2 designated as the communication partner is not registered, register the terminal A in the group management table as a member of the formed group (S103), allocate a channel to the terminal A (S104), register information on the terminal A in the terminal management table (S105), and transmit the status notification to the terminal A, thereby notifying the allocated channel thereto (S106). Incidentally, since no other terminals are registered in the group in which the terminal A is registered, the status notification is not sent to any other terminals.

Then, in response to the notification at Step S106, the terminal A executes the processing at and after Step S43 in FIG. 10 to allocate CH#1 to the performance input device 16 and set the contents of Prog #1 on the channel CH#1 in the sound source module 17 (S107).

FIG. 13A and FIG. 13B show states of the group management table and the terminal management table when this processing is completed.

As shown in these drawings, in the group management table, the group GRP #1 is newly formed and ID#1 which is the ID of the terminal A is added, and the information on the terminal A is registered also in the terminal management table. The channel number is dynamically allocated by the management server 100. Note that information on the communication partner has no special meaning after it is registered in the table.

Next, FIG. 14 shows an example of a processing sequence when the next terminal (terminal B) transmits the join notification indicating its intention to perform a session with the terminal A after the processing in FIG. 12.

In this case, the terminal B (its ID is "ID#2") transmits to the management server 100 the join notification including ID#2 as the own ID, ID#1 as the communication partner ID, Prog#2 as the information on the setting in the sound source (S111).

Then, the management server 100 receiving the join notification also executes the processing at and after S13 in FIG. 4. Since the device with ID#1 designated as the communication partner has been already registered in the group GRP#1, the management server 100 registers the terminal B in the group management table as a member of the group GRP#1 (S112), allocates to the terminal B a channel different from that allocated to the terminal A (S113), registers information on the terminal B in the terminal management table (S114), and transmits the status notification to the terminal B, thereby notifying the allocated channel and the information on the terminal A in the same group (S115).

Then, according to this notification, the terminal B executes the processing at and after Step S43 and the processing at and after S46 in FIG. 10 to allocate CH#2 to the performance input device 16, set the contents of Prog#1 and Prog#2 on CH#1 and CH#2 respectively in the sound source module 17, and register the address information of the terminal A in the transmission destination list (S116).

Further, the management server 100 transmits the status notification also to the terminal A, thereby notifying the information on the terminal B newly registered in the same group (S117). Then, the terminal A executes the processing at and after Step S46 in FIG. 10 to set the contents of Prog#2 on the channel CH#2 in the sound source module 17 according to this notification and register the address information of the terminal B in the transmission destination list (S118).

Then, by the foregoing processing, the terminal A and the terminal B come to be capable of transmitting/receiving the MIDI data on the peer-to-peer basis to/from each other to start their communication (S119).

FIG. 15 shows states of the group management table and the terminal management table when this processing is completed.

As shown in FIG. 15, in the group management table, ID#2, which is the ID of the terminal B, is added as a member of the group GRP#1, and the information on the terminal B is registered also in the terminal management table. Further, by referring to the terminal management table or by directly referring to the group management table, it is known that the device with ID#1 designated as the communication partner by the terminal B is a member of the group GRP#1.

Figure 16:
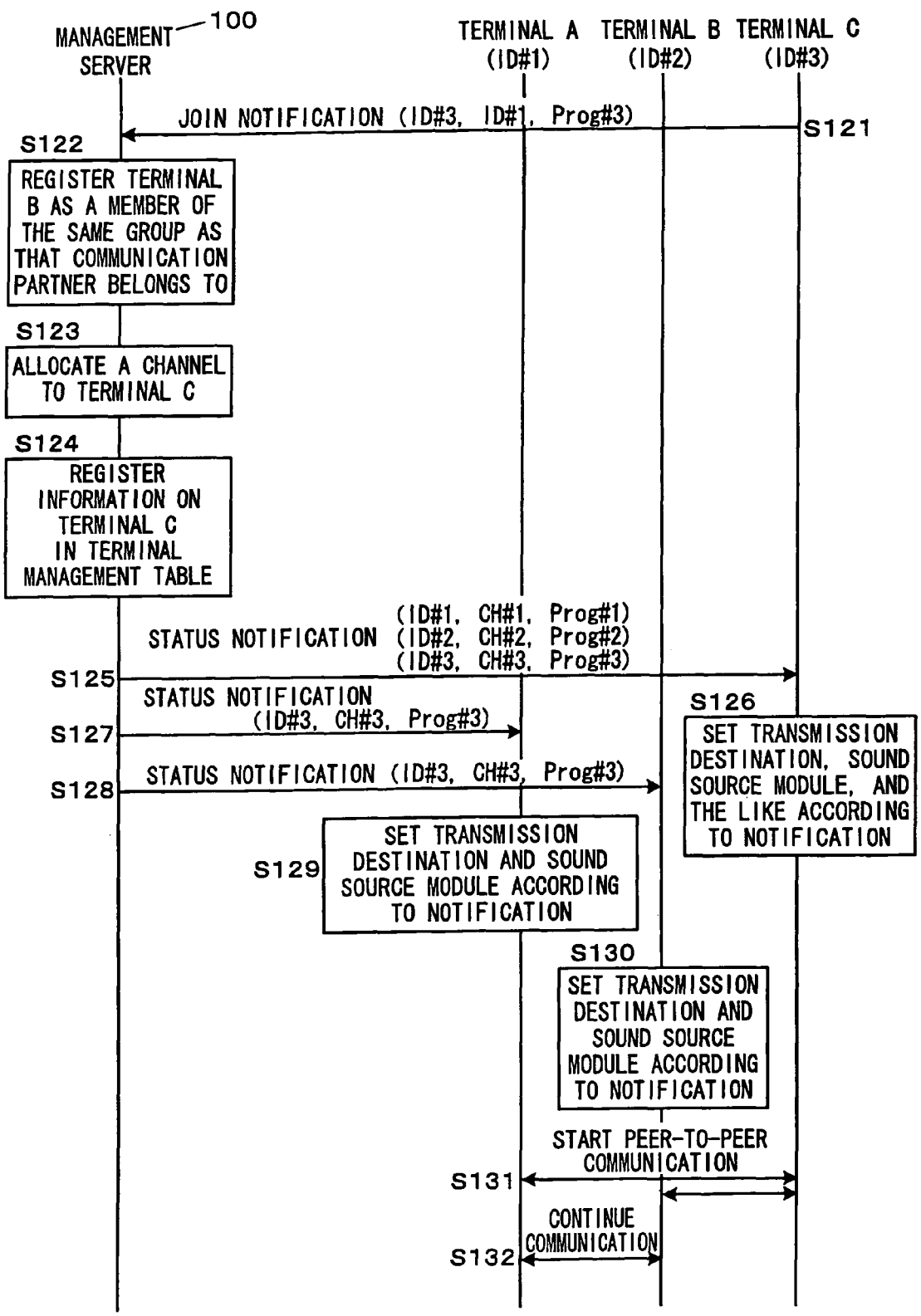
FIG. 16 is a chart showing an example of a processing sequence when a next terminal C transmits a join notification indicating its intension to perform a session with the terminal A after the processing in FIG. 14.

Next, FIG. 16 shows an example of a processing sequence when a next terminal (terminal C) transmits the join notification indicating its intention to perform a session with the terminal A.

In this case, the terminal C (its ID is #ID#3) transmits to the management server 100 the join notification including ID#3 as the own ID, ID#1 as the communication partner ID, and Prog#3 as the information on the setting in the sound source (S121). Note that the same operation as that described below is executed also when the communication partner ID is ID#2.

Then, the management server 100 receiving the join notification similarly executes the processing at and after Step S13 in FIG. 4 to register the terminal C in the group management table as a member of the group GRP#1 (S122) since the device with ID#1 designated as the communication partner is registered in the group GRP#1, allocate to the terminal C a channel different from those allocated to the terminal A and the terminal B (S123), register information on the terminal C in the terminal management table (S124), and transmit the status notification to the terminal C, thereby notifying the allocated channel and the information on the terminal A and the terminal B in the same group (S125).

Then, according to this notification, the terminal C executes the processing at and after Step S43 and the processing at and after Step S46 in FIG. 10 to allocate CH#3 to the performance input device 16, set the contents of Prog#1, Prog#2, and Prog#3 on the channels CH#1, CH#2, CH#3 respectively in the sound source module 17, and register address information of the terminal A and the terminal B in the transmission destination list (S126).

Further, the management server 100 transmits the status notification also to the terminal A and the terminal B, thereby notifying information on the terminal C newly registered in the same group (S127, S128). Then, each of the terminal A and the terminal B executes the processing at and after Step S46 in FIG. 10 according to this notification to set the contents of Prog#3 on the channel CH#3 in the sound source module 17 and register address information of the terminal C in the transmission destination list (S129, S130).

Then, by the foregoing processing, the terminal C comes to be capable of transmitting/receiving MDI data on the peer-to-peer basis to/from the terminal A and the terminal B to start communicating with them (S131). Further, the terminal A and the terminal B continue their communication as before (S132). Therefore, by the foregoing processing, the terminals A, B, and C come to be capable of communicating with one another on the peer-to-peer basis.

Further, on the terminal C side, only by designating one communication partner, it comes to be capable of communicating with another partner communicating with this communication partner at the same time.

Figure 17:
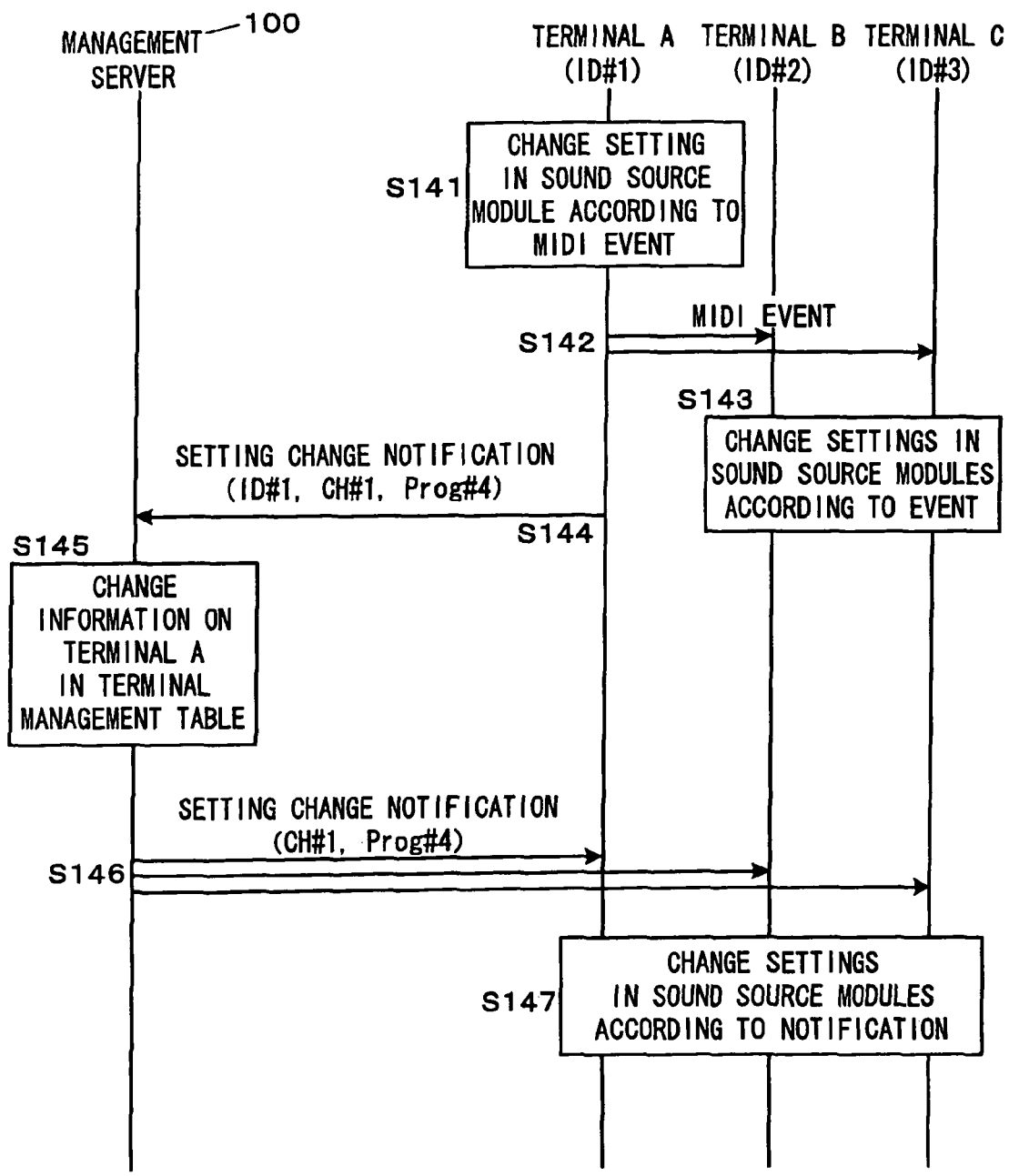
FIG. 17 is a chart showing an example of a processing sequence when an operation for changing a setting in a sound source module is performed in the terminal A after the processing in FIG. 16.

Next, FIG. 17 shows an example of a processing sequence when an operation of changing the setting in the sound source module 17 is performed in the terminal A after the processing in FIG. 16.

In this case, when detecting the setting change operation, the terminal A generates a corresponding MIDI event (here, a MDI program change event for changing the setting on the channel CH#1 to Prog#4) to supply it to the sound source module 17 and changes the setting in the sound source module 17 (S141). Further, it transmits the same MIDI event to the transmission destinations registered in the transmission destination list (S142). Then, the other terminals receiving the MIDI event execute the processing at Step S52 in FIG. 10 to also change the settings in the sound source modules 17 according to the MIDI event (S143).

Meanwhile, the terminal A transmits the setting change notification, which indicates that the setting on the channel CH#1 is changed to Prog#4, also to the management server 100 (S144). Then, the management server 100 executes the processing at and after Step S22 in FIG. 4 to change the information on the terminal A in the terminal management table according to the contents of the notification (S145) and transmit the setting change notification to the terminals in the same group to which the terminal A belongs, thereby notifying the change of the setting thereto (S146). Then, each of the terminals receiving the notification executes the processing at Step S50 in FIG. 10 to change the setting in the sound source module 17 according to the contents of the notification (S147). As describe above, the processing at Step S147 is executed in order to prevent an error, even though being redundant in a normal time since this processing overlaps with the processing at Step S141 or S143.

As a result of the foregoing processing, the change of the setting in the sound source module 17 in one terminal can be reflected in the other terminals.

Figure 18:
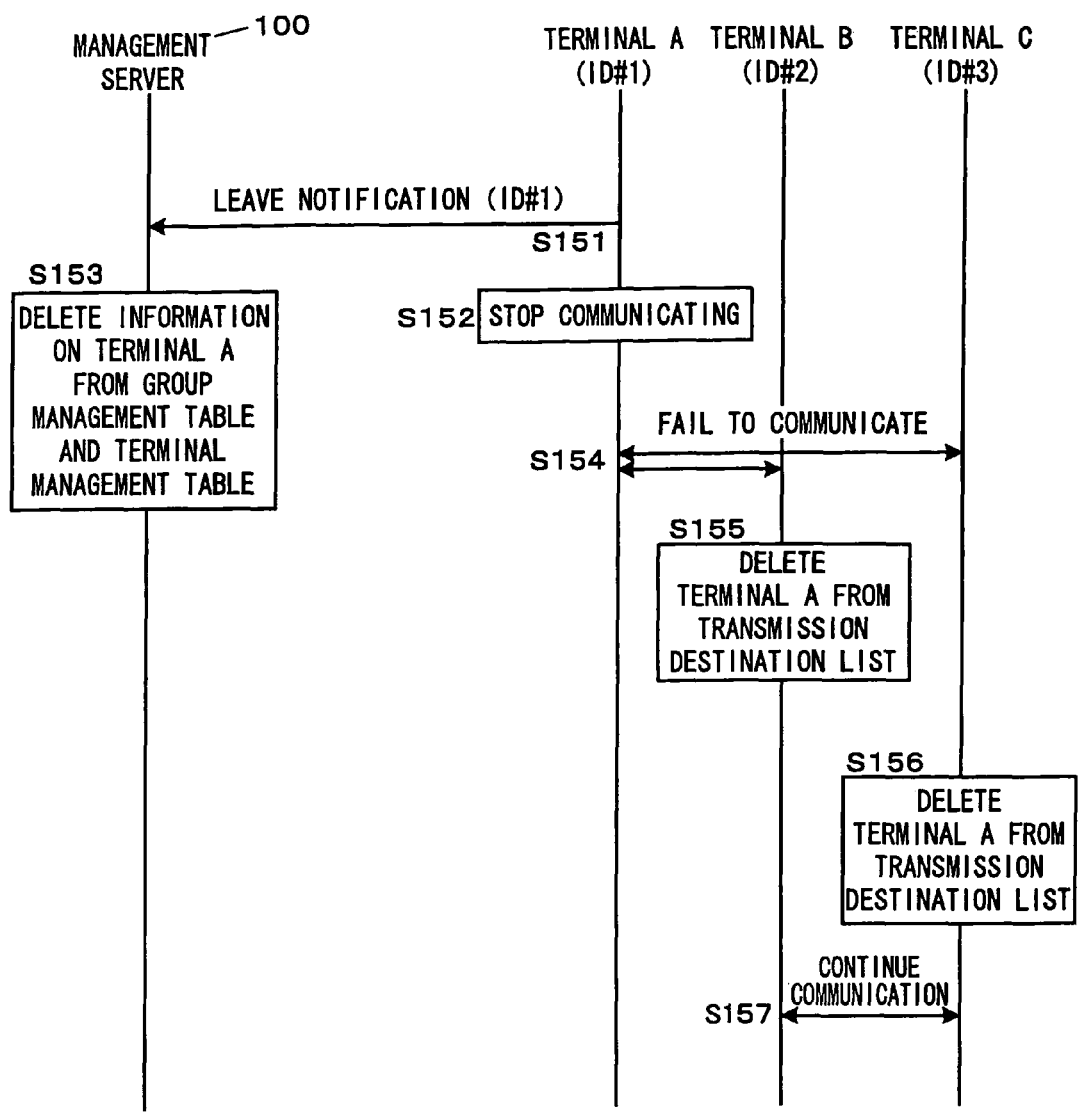
FIG. 18 is a chart showing an example of a processing sequence when a session end operation is performed in the terminal A after the processing in FIG. 17.

Next, FIG. 18 shows an example of a processing sequence when a session end operation is performed in the terminal A after the processing in FIG. 17.

In this case, when detecting the end operation, the terminal A transmits the leave notification to the management server 100 (S151) and at the same time, stops communicating with the other terminals (S152). Then, in response to the leave notification, the management server 100 executes the processing at and after Step S32 in FIG. 5 to delete the information on the notifying terminal A from the group management table and the terminal management table (S153).

Further, the terminal B and the terminal C which have been performing the session with the terminal A fail to communicate with the terminal A (S154) and thus execute the processing at Step S54 in FIG. 10 to delete the terminal A from the respective transmission destination lists (S155, S156). However, the terminal B and the terminal C continue their communication (S157).

By the foregoing processing, the terminal A can leave the session.

According to the communication management system 1 for performance data as has been described hitherto, when joining the session, only by designating one of the terminals with which the terminal 10 wants to exchange data and by transmitting a join request to the management server 100, each of the terminals 10 can join the session joined by the designated terminal and transmit/receive data to/from all the terminals joining the same session. Further, when a desired communication partner is not performing a session, a new session group can be automatically formed. This eliminates a need for a complicated operation such as an operation of setting a session room for joining the session, so that the degree of freedom in forming a session can be enhanced and each device can join the session with a simple operation.

Moreover, if the management server 100 also manages the information on the settings in the sound sources, it can notify a terminal newly joining the session of the contents of the settings in the sound source modules in the terminals already joining the session, and conversely, can notify the terminals already joining the session of the contents of the settings in the sound source module in the terminal newly joining the session. Therefore, if each device makes the setting in the sound source module based on this notification, it is possible to set the common contents in the sound source modules of the devices joining the same session without a user's special setting operation when each device joins the session. Therefore, the same sound can be generated according to a MIDI event whichever device the MIDI event is transmitted to.

Further, the transfer of the MIDI data among the terminals does not include the intervention of the management server 100 but is peer-to-peer transfer, which can reduce a delay amount of data transmission.

Second Embodiment

FIG. 19 to FIG. 27

Next, a second embodiment of the communication management system for performance data of the invention will be described. FIG. 19 is a block diagram showing a schematic configuration of the communication management system for performance data.

In the communication management system 2 for performance data shown in FIG. 19, a plurality of terminals 20 are capable of communicating with one another via a network 30 and each of the terminals 20 has the function of the terminal 10 and the function of the management server 100 which are described in the first embodiment. That is, each of the terminals 20 corresponds to both an electronic musical apparatus and a communication management device for performance data. Note that one of the terminals 20 serves as a master node in a session of one group, and the function as the management server 100 is effective only in the master node and the function as the management server 100 is invalid in the other terminals 20.

Incidentally, if a situation should occur in which two or more terminals 20 become masters in a session of one group simultaneously, they negotiate with each other appropriately and by giving a higher priority to the terminal whose timestamp for the time at which it becomes a master is earlier or by a random method, one of the terminals 20 is determined as a terminal functioning as a master node. When two or more terminals 20 try to join a session simultaneously, such a situation is likely to occur. Another possible setting is to allow only one master node to exist within a range with which each terminal 20 is communicatable via the network 30.

As the network 30, usable are various kinds of communication pathways such as a LAN and the Internet. Any network topology is usable.

The terminal 20 as described above has the same hardware configuration as that of the terminal 10 of the first embodiment, and therefore, description thereof will be omitted. Further, the same reference numerals as in FIG. 2 are used -to designate the corresponding components.

Hereinafter, various kinds of processing executed by the terminal 20 will be described with reference to flowcharts in FIG. 20 to FIG. 24. What are common to the processing described in the first embodiment will be briefly described or will not be described.

First, FIG. 20 shows a flowchart of processing for joining a session.

When accepting an instruction to join a session by a not-shown control, the terminal 20 starts processing shown in the flowchart in FIG. 20. Then, the terminal 20 first broadcasts a master search notification to all the nodes on the network 30 or to an address range where a partner that the terminal 20 wants to communicate with by a session is assumed to exist, thereby conducting a search to find whether or not there exists a terminal 20, that has already become a master node (hereinafter, simply referred to as "a master") (S201). If the desired communication partner is individually known, the master search notification may be individually transmitted thereto. In the processing at Step S201, a CPU of the terminal 20 functions as a searcher.

Then, since a device functioning as a master, if any, should send back a response, it is judged based on the existence of the response whether or not the master exists (S202). If YES, a join notification is transmitted to the master (S203) and the processing is ended. This join notification may have the same structure as that shown in FIG. 6, but since it is at least clear that the master is the communication partner here, the communication partner ID need not be included.

On the other hand, if there exists no master, the own device is defined as a master (S204), a channel used by itself is determined (S205), and a setting used by itself is made on the determined channel in a sound source module 17 (S206). Then, a node information table is prepared, necessary information is registered therein (S207), and then the processing is ended.

Next, FIG. 21 shows an example of the node information table.

The node information table is stored in each of the terminals 20 and corresponds to the terminal management table in the first embodiment. It includes information regarding a session joined by itself, namely, information on the terminals joining the session and information on an ID of the master in this session.

The IDs, the channel numbers, and information on the settings in the sound sources are registered as the information on the terminals. Here, since the information on the terminals joining one session is handled, the communication partner ID and the group number are not necessary and are not registered.

At least the master needs to store this node information table, but here all the terminals 20 joining the session store the node information table in consideration of simplifying processing when the master leaves the session.

Figure 22:
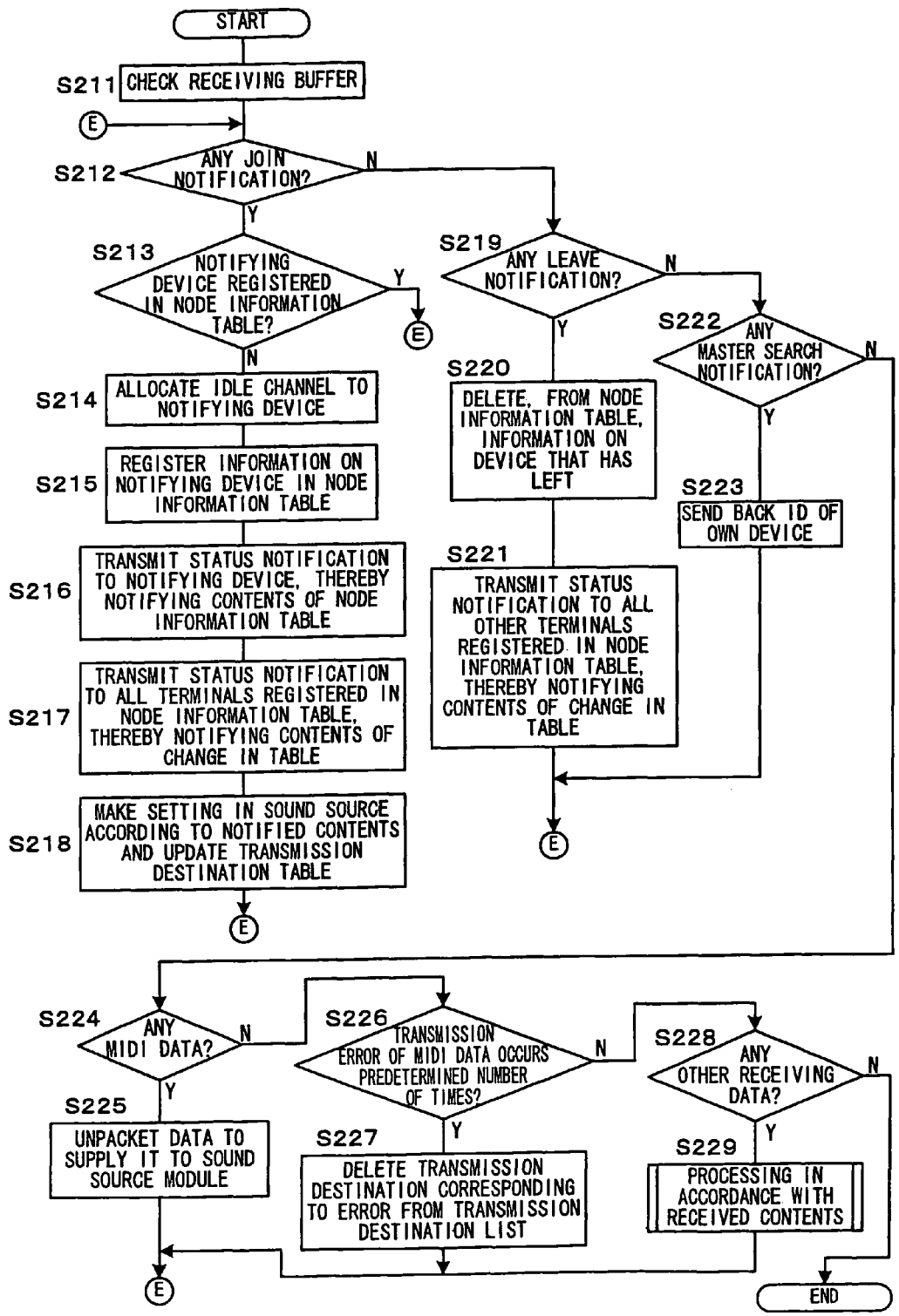
FIG. 22 is a flowchart of processing for received data executed by a master terminal in the system in FIG. 19.

Next, FIG. 22 shows a flowchart of processing in accordance with received data executed by the terminal 20 being the master.

The terminal 20 temporarily stores, in a receiving buffer, data received from external devices such as the other terminals 20, and when the terminal 20 itself is a master, it executes the processing shown in the flowchart in FIG. 22 at a regular timing to execute processing appropriate for the data.

Then, the receiving buffer is first checked in this processing (S211). Then, if there exists any join notification (S212), processing for the join notification at Steps S213 to S218 is executed. This processing is the same as the processing at Steps S13 to S20 in FIG. 4 except in the following respects. Namely, a table referred to is the node information table, no processing regarding a group is included, the contents of the node information table are all transmitted at the time of information notification to the notifying device, and the master itself also updates the transmission destination list and makes the setting in the sound source in the same manner as at Steps S47 and S48 in FIG. 10 (S218).

Further, in the processing at Steps S213 to S218, the CPU of the terminal 20 functions as a session information notifying device. Further, since the terminals 20 other than the master do not execute this part of the processing as will be described later, it can be said that the function of the session information notifying device becomes effective when they come to operate as a master, and vice versa.

Then, after Step S218, the flow returns to Step S212, and the processing is repeated. If another data is found in the receiving buffer, the processing in accordance with this data is executed.

On the other hand, if no join notification is found at Step S212, the flow goes to Step S219, and if any leave notification is found here, processing in accordance with the leave notification at Steps S220 and S221 is executed. This processing corresponds to the processing at and after Step S132 in FIG. 5. However, since each of the terminals 20 stores the node information table here, the contents of the change in the table are notified also to the other terminals (S221).

On the other hand, if no leave notification is found at Step S219, the flow goes to Step S222. Then, if any master search notification is found, the own ID is sent back as a response (S223).

Further, when no master search notification is found at Step S222, the flow goes to processing at and after Step S224, and if any MIDI data, communication error, or other data is found, processing in accordance with the found data is executed (S224 to S229). This processing is the same as that at Steps S51 to S56 in FIG. 10.

Further, after Steps S221, S223, S225, S227, and S229, the flow returns to Step S212, and the processing is repeated.

Figure 23:
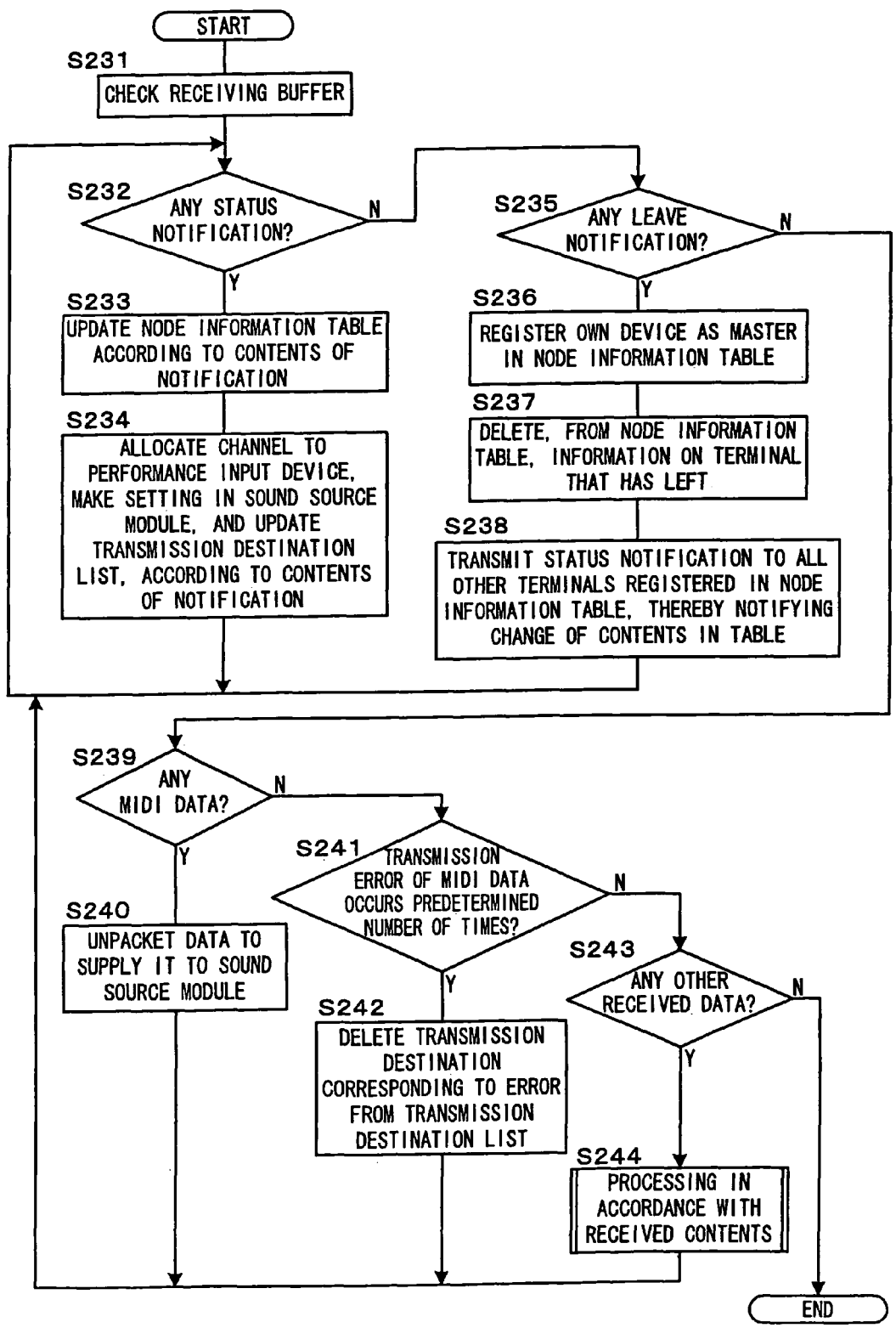
FIG. 23 is a flowchart of processing for received data executed by a terminal other than the master terminal in the system shown in FIG. 19.

Next, FIG. 23 shows a flowchart of processing for received data executed by the terminal 20 other than the master.

The terminal 20 other than the master executes the processing shown in the flowchart in FIG. 23 at a regular timing instead of the processing shown in the flowchart in FIG. 22 to execute processing appropriate for the data stored in the receiving buffer.

Then, in this processing, the receiving buffer is first checked (S231). Then, if any status notification is found (S232), the node information table stored in itself is updated according to the contents of the notification (S233), a channel is allocated to the performance input device 16, the setting is made in the sound source module, and the transmission destination list is updated (S234). The processing at Step S234 corresponds to the processing at Steps S42 to S48 in FIG. 10.

On the other hand, if no status notification is found at Step S232, the flow goes to Step S235. Then, if any leave notification is found, processing in accordance with the leave notification at Steps S236 to S238 is executed. Incidentally, when leaving the session, each of the terminals 20 other than the master transmits the leave notification to the master, and therefore the terminals 20 other than the master receive the leave notification only from the master. Conversely, when intending to leave the session, the master transmits the leave notification to the terminal 20 that the master intends to designate as a next master among the terminals 20 joining the session.

Then, in the processing in accordance with the leave notification, the own device is first registered as a master in the node information table (S236), and information on the terminal that has left the session (previous master) is deleted from the node information table (S237). Consequently, the terminal 20 executing this processing functions as a master hereafter, and the channel allocation to the terminal that has left the session is cancelled. Thereafter, a status notification is transmitted to all the other terminals registered in the node information table, whereby the contents of the change in the table are notified thereto (S238). By the foregoing processing, the master can be changed.

Further, if no leave notification is found at Step S235, the flow goes to processing at and after Step S239, and if any MIDI data, communication error, or other data is found, processing in accordance with the found data is executed (S239 to S244). This processing is the same as the processing at Steps S51 to S56 in FIG. 10.

Further, after Steps S234, S238, S240, S242, and S244, the flow returns to Step S232, and the processing is repeated.

When the setting in the sound source in each of the terminals joining the session is changed, the terminal 20 being the master, unlike the management server 100, is notified of the change by the MIDI event. Further, without separately storing the contents thereof, it is possible to know what kind of setting is made on a channel allocated to each of the terminals by referring to the contents of the setting in the own sound source module 17. Therefore, unlike the first embodiment, based on this information, the contents of the information on the setting in the sound source in the node information table can be kept consistent with the current status of the respective terminals without using the setting change notification (this processing is not shown in the drawing). However, also in this embodiment, the setting change notification may be transmitted/ received, separately from the transmission/reception of the MIDI event. This also applies to the master as well as the terminals 20 other than the master.

Figure 24:
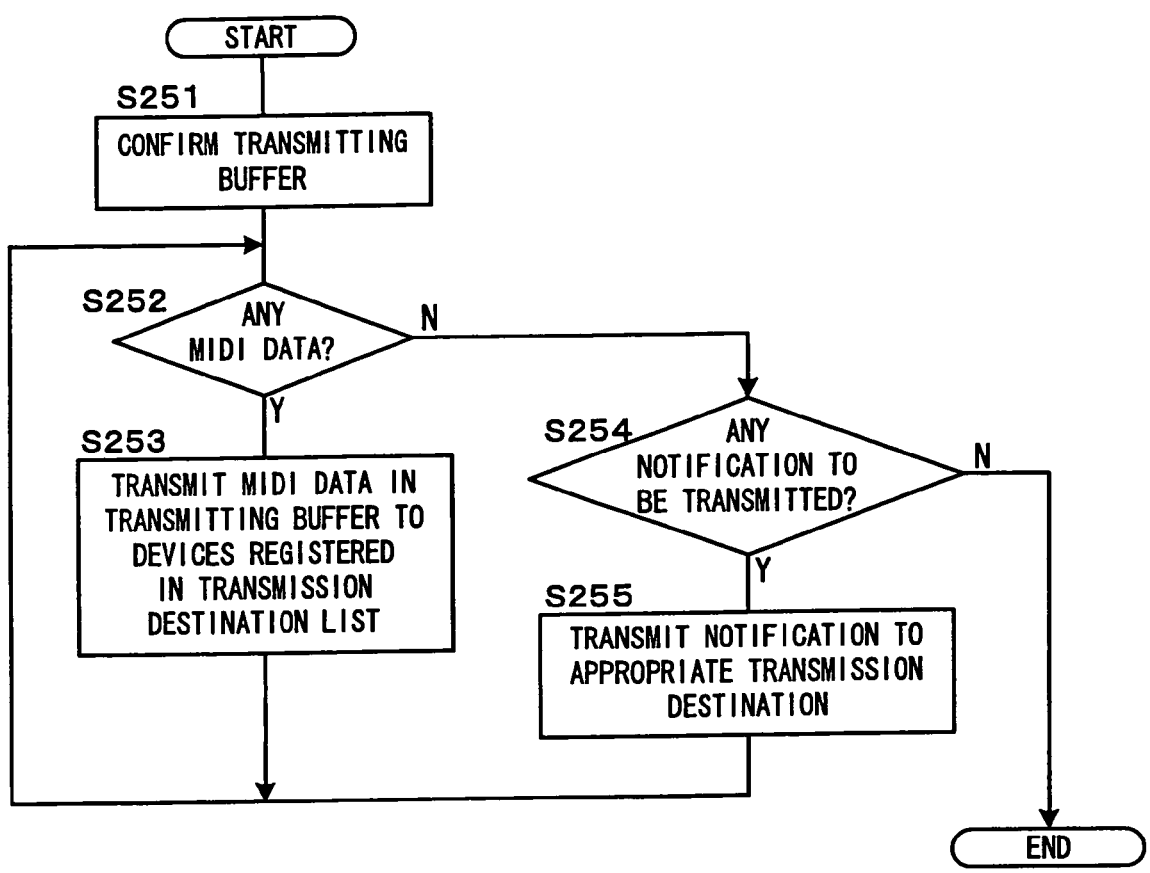
FIG. 24 is a flowchart of processing for data transmission executed by each of the terminals in the system shown in FIG. 19.

Next, FIG. 24 shows a flowchart of processing for data transmission executed by the CPU of the terminal 20.

This processing is executed commonly by the master and the terminals other than the master. Notifications transmitted in this processing include the join notification, the leave notification, the master search notification, and the like, and since a transmission destination is not unique, the other party to which the notification is to be transmitted (for example, the master) is specified when the notification is transmitted at Steps S254 and S255. In other respects, the processing shown in FIG. 24 is substantially the same as the processing shown in FIG. 11 in the first embodiment.

By executing the processing shown in FIG. 22 and FIG. 24 described above, the terminal 20 as the master is capable of performing operations including both the function of the terminal 10 and the function of the management server 100 in the first embodiment.

Further, by executing the processing shown in FIG. 23 and FIG. 24 described above, the terminals 20 other than the master are capable of performing operations for functioning as a next master when requested by the master while realizing the same function as that of the terminal 10 in the first embodiment.

Next, with reference to FIG. 25 to FIG. 27, an example of an operation sequence that each of the terminals 20 executes by the above-described processing will be described. Note that in these drawings, respective terminals are denoted by reference numerals with A, B, and C in order to discriminate the plural terminals from one another.

Figure 25:
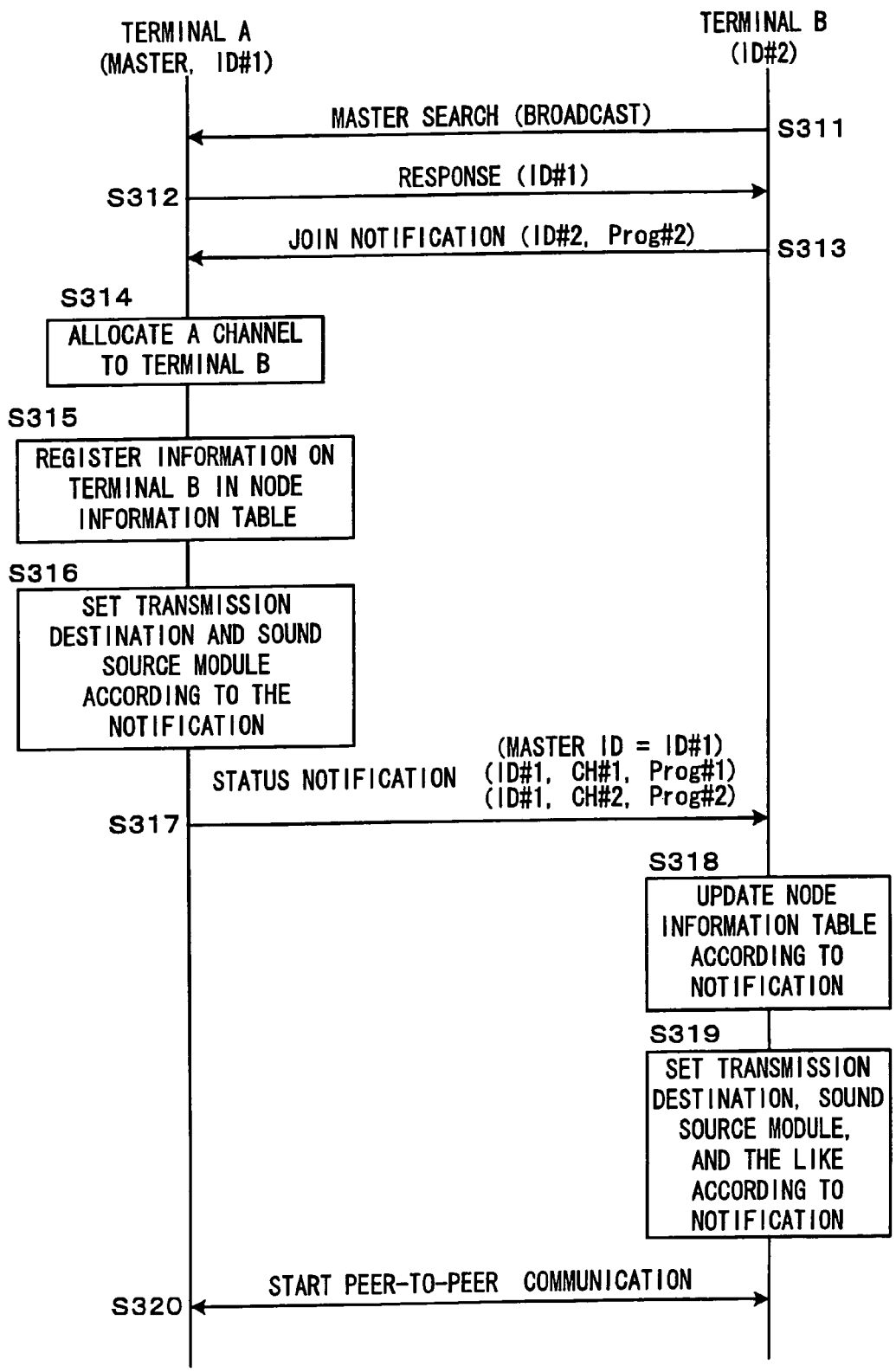
FIG. 25 is a chart showing an example of a processing sequence when a second terminal B transmits a join notification to a master terminal A.

First, FIG. 25 shows an example of a processing sequence when a second terminal (terminal B) transmits the join notification to a terminal A (its ID is "ID#1") being the master.

In this case, the terminal B. (its ID is "ID#2") executes the processing at Step S201 in FIG. 20 to conduct a master search by broadcast (S311), and the terminal A being the master sends back a response thereto by executing the processing at Step S223 in FIG. 22 (S312). Then, by the processing at S203 in FIG. 20, the terminal B transmits the join notification including the ID#2 as the own ID and Prog#2 as the information on the setting in the sound source to the terminal A sending back the response (S313).

Then, the terminal A receiving the join notification executes the processing at and after Step S214 in FIG. 22 to allocate to the terminal B a channel CH#2 different from a channel allocated to the terminal A (S314), register information on the terminal B in the node information table (S315), set the contents of Prog#2 on the channel CH#2 in the sound source module 17 according to the contents of the notification, and register address information of the terminal B in the transmission destination list (S316). Thereafter, the status notification is transmitted to the terminal B, whereby the contents of the node information table are notified thereto (S317).

Then, according to this notification, the terminal B executes the processing at and after Step S233 in FIG. 23 to update (in this case, newly prepare) the node information table (S318), allocate CH#2 to the performance input device 16, set the contents of Prog#1 and Prog#2 in the channels CH#1 and CH#2 respectively in the sound source module 17, and register address information of the terminal A in the transmission destination list (S319).

Consequently, the terminal A and the terminal B come to be capable of transmitting/receiving the MIDI data on the peer-to-peer basis to/from each other to start their communication (S320).

Figure 26:
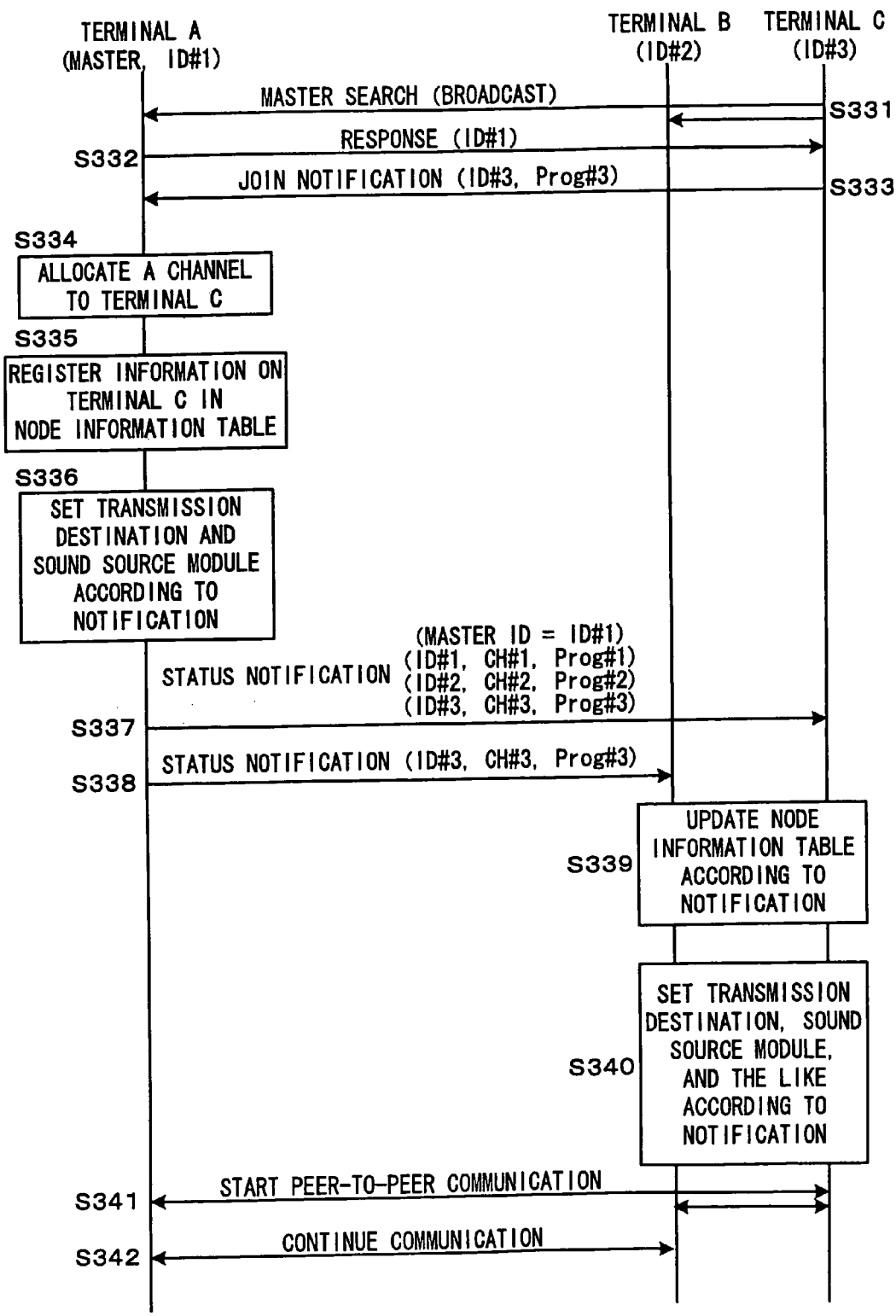
FIG. 26 is a chart showing an example of a processing sequence when a next terminal C transmits a join notification to the terminal A after the processing in FIG. 25.

Next, FIG. 26 shows an example of a processing sequence when a next terminal (terminal C) transmits the join notification to the terminal A after the processing in FIG. 25.

In this case, the terminal C (its ID is "ID#3"), similarly to the case in FIG. 25, exchanges the master search and the response with the terminal A (S331, S332), and thereafter transmits to the terminal A the join notification including ID#3 as the own ID and Prog#3 as the information on the setting in the sound source (S333).

Then, the terminal A receiving the join notification similarly executes the processing at and after Step S214 in FIG. 22 to allocate to the terminal C a channel CH#3 different from channels allocated to the terminal A and the terminal B (S334), register information on the terminal C in the node information table (S335), set the contents of Prog#3 on the channel CH#3 in the sound source module 17 according to the contents of the notification, and register address information of the terminal C in the transmission destination list (S336). Thereafter, the status notification is transmitted to the terminal C, whereby the contents of the node information table are notified thereto (S337). Further, the contents of the change in the node information table are also notified to the terminal B joining the same session (S338).

Then, the terminal B and the terminal C update the respective node information tables according to the status notification (S339) and set transmission destinations, sound sources, and so on (S340). Consequently, the terminal C comes to be capable of transmitting/receiving MIDI data to/from the terminal A and the terminal B on the peer-to-peer basis to start communicating with them (S341). Further, the terminal A and the terminal B continue their communication as before (S342). Therefore, by the above-described processing, the terminals A, B, and C come to be capable of communicating with one another on the peer-to-peer basis.

Further, on the terminal C side, only by transmitting the join notification to the master, it comes to be capable of simultaneously communicating with all the terminals joining the session managed by the master.

Figure 27:
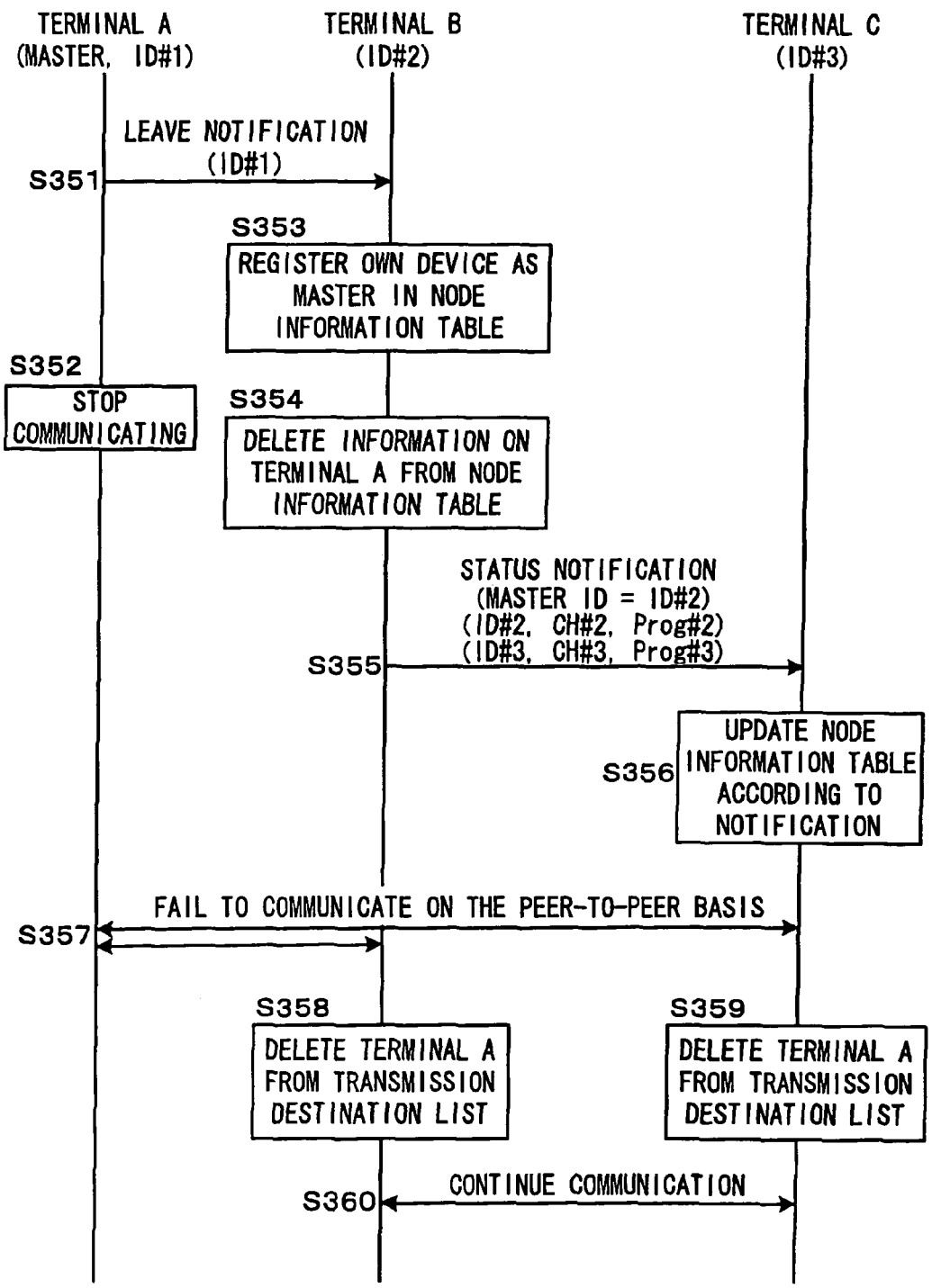
FIG. 27 is a chart showing an example of a processing sequence when a session end operation is performed in the terminal A after the processing in FIG. 26.

Next, FIG. 27 shows an example of a processing sequence when a session end operation is performed in the terminal A after the processing in FIG. 26.

In this case, when detecting the end operation, the terminal A transmits the leave notification to one of the terminals joining the session (S351) and stops communicating with the other terminals (S352). The terminal to which the leave notification is to be transmitted may be appropriately determined either at random, according to a user's instruction, or by the other methods.

Here, supposing that the terminal B is the transmission destination, the terminal B executes the processing at and after Step S236 in FIG. 23 to register itself as a master in the node information table (S359) and delete the information on the terminal A from the node information table (S354). Then, the terminal B transmits the status notification to the other nodes registered in the node information table, whereby the contents of the change in the node information table (here the table itself having undergone the change) are notified thereto (S355).

Here, the destination of this notification is the terminal C, and the terminal C receiving this notification executes the processing at and after Step S233 in FIG. 23 to update the node information table according to the contents of the notification (S356).

Further, the terminal B and the terminal C having been performing the session with the terminal A so far fail to communicate with the terminal A due to the communication termination of the terminal A (S357), and therefore, executes the processing at Step S242 in FIG. 23 to delete the terminal A from the respective transmission destination lists (S358, S359). However, the terminal B and the terminal C continue their communication (S360).

Alternatively, the deletion of the terminal A from the transmission destination list may immediately follow Step S354 or S356.

By the foregoing processing, the terminal A can leave the session and hand over the operation as the master to the terminal B. In this case, since the node information table is stored in each of the terminals, the terminal A only has to transmit the leave notification when leaving the session. This can prevent the occurrence of high-load processing at the time of the leave.

The description of the embodiments ends here, and it goes without saying that the configuration of the devices, concrete contents of the processing, data format, and so on are not limited to those described in the above-described embodiments.

For example, the format of the handled performance data is not limited to the MIDI format, nor is the system limited to a system transferring the MIDI data on the peer-to-peer basis. The data may be transferred to/from the terminals 10 via the management server 100 or via another transfer server.

Further, in the first embodiment, another possible processing for changing the setting in the sound source module 17 is such that each of the terminals 10, when changing the setting in the sound source module 17 while joining the session, does not transmit the contents of the change to the other terminals but transmits the contents only to the management server 100, and the other terminals change the settings in the sound source modules 17 according to the setting change notification transmitted form the management server 100.

In this case, the terminal 10 trying to change the setting may be capable of changing the setting in the own sound source module 17 according to the MIDI event generated by itself, or may change the setting in the own sound source module 17 also according to the setting change notification transmitted from the management server 100. In this case, the contents of the settings in the sound source modules 17 of all the terminals joining the session can be easily kept uniform.

Further, the management server 100 may periodically notify the contents of the settings in all the terminals joining each session to all the terminals joining the session even when no special change is made. Even when part of data suffers lack due to communication trouble, such periodic notification makes it possible to compensate the lack when the notification is transmitted thereafter.

Another possible configuration is such that the ID used when each of the terminals joins the session is registered/stored in a portal site or the like on the Internet so as to be publicly accessible, and a user can find a partner in the session by, for example, searching a user list of the portal site. In this case, the user designates an ID obtained by the search as an ID of the communication partner to transmit a request to join the session to the management server 100.

Further, to manage and notify the contents of the setting in the sound source is not essential as the function of the management server 100, but the minimum necessary function is to manage the IDs of the terminals in each group performing the session, allocate the channels to the terminals, and notify the IDs and the channels by the above-described status notification.

Further, the foregoing has described the example where one channel is allocated to each of the terminals joining the session. However, this is not restrictive, and a plurality of channels may be allocated to each of the terminals.

Further, when a device having the functions of both the terminal 10 and the management server 100 is provided, devices having these functions separately may be simply provided instead of providing a device having the combined functions as in the second embodiment. In this case, there may possibly be a case where the terminal 10 manages a session that the terminal 10 itself does not join. Further, in this case, only one terminal 10 needs to have the function of the management server 100.

Further, in the second embodiment, when transmitting the MIDI data, each of the terminals 20 may handle the terminals registered in the node information table as the transmission destinations without storing the transmission destination list.

Moreover, programs for causing a computer to function as the above-described terminals 10, 20 and management server 100 may be stored in advance in a ROM, a HDD, or the like, or such programs may be recorded in a nonvolatile recording medium (memory) such as a CD-ROM or a flexible disk to be read to a RAM from the memory, thereby causing the CPU to execute the programs, or the programs may be downloaded for execution from an external device including a recording medium in which the programs are recorded or from an external device storing the programs in a memory such as a HDD. In either of the cases, the same effects are obtainable.

Further, it goes without saying that the contents of modification examples of the respective embodiments may be combined for application within a range not causing inconsistency.

As is apparent from the foregoing description, according to the communication management system for performance data or the communication management device for performance data of the invention, when performance data is transmitted/received to/from a plurality of terminals, it is possible to enhance the degree of freedom in forming a session for data transmission/reception and it is possible for each terminal to join a session with a simple operation.

Therefore, a communication environment with high operability can be provided.

What is claimed is:

1. A communication management system for performance data comprising:
   a plurality of electronic musical apparatuses transmitting/receiving performance data to/from one another over a peer-to-peer network; and
   a communication management device managing the transmission/reception of the performance data among the plural electronic musical apparatuses,
   wherein said communication management device comprises:
   a memory that stores, as information on a session or sessions for the transmission/reception of the performance data, identification data of the electronic musical apparatuses belonging to the session; and
   a session information notifying device that, when an electronic musical apparatus designates a communication partner to request to join a session,
   a) determines whether the communication partner belongs to one of the session(s) from the information stored in the memory; and
      1) recognizes the one session as a target session, upon determining the communication partner belongs to the one session, and
      2) automatically creates another session and recognizes the created session as the target session, upon determining that the communication partner does not belong to any of the session(s),
   b) stores the identification data of the requesting electronic musical apparatus into the memory as identification data of the electronic musical apparatus belonging to the target session,
   c) allocates a channel different from channels allocated to the other electronic musical apparatuses in the target session,
   d) notifies the requesting electronic musical apparatus of the allocated channel together with the identification data of the electronic musical apparatuses belonging to the target session and channels used by the electronic musical apparatuses belonging to the target session as the session information, and
   e) notifies each of the electronic musical apparatuses belonging to the target session other than the requesting electronic musical apparatus of the identification data of the requesting electronic musical apparatus, the channel allocated to the requesting electronic musical apparatus, and information on setting in a tone generator of the requesting electronic musical apparatus notified by the requesting electronic musical apparatus, as the session information, and
   wherein each of said electronic musical apparatuses comprises:
   the tone generator;
   a requesting device that designates the communication partner, and transmits a designation of the communication partner to request to join the session and a notification of the information on the setting in the tone generator of the electronic musical apparatus itself to said communication management device;
   a device that receives the notification of the session information from said communication management device; and
   a device that sets a channel used by the electronic musical apparatus itself, an address information of an apparatus which is to be the communication partner, a channel used by the communication partner, and parameters for sound generation in the tone generator, based on the session information notified by said communication management device, and controls transmission/reception of the performance data over/from the peer-to-peer network and the sound generation in the tone generator based on the settings on parameters for sound generation in the tone generator.

2. The communication management system for performance data according to claim 1, wherein each of said electronic musical apparatuses comprises:
   a change notifying device that notifies both of the other electronic musical apparatuses belonging to the same session and said communication management device of contents of a change of a setting in the tone generator of the electronic musical apparatus itself if the setting is changed while the electronic musical apparatus belongs to the session, and wherein said communication management device stores, in said memory, information on settings in the tone generators of said electronic musical apparatuses, in correspondence to the identification data of said electronic musical apparatuses, and when receiving the contents of the change of the setting in the tone generator from said electronic musical apparatus, changes the information on the setting in the tone generator stored in said memory based on the received contents.

3. A communication management device for performance data that manages transmission/reception of the performance data among a plurality of electronic musical apparatuses, the device comprising:

a memory that stores, as information on a session or sessions for the transmission/reception of the performance data, identification data of the electronic musical apparatuses belonging to the session; and a session information notifying device that, when the electronic musical apparatus designates a communication partner to request to join a session, a) determines whether the communication partner belongs to one of the session(s) from the information stored in the memory; and 1) recognizes the one session as a target session, upon determining the communication partner belongs to the one session, and 2) automatically creates another session and recognizes the created session as the target session, upon determining that the communication partner does not belong to any of the session(s), b) stores the identification data of the requesting electronic musical apparatus into the memory as the identification data of the electronic musical apparatus belonging to the target session, c) allocates a channel different from channels allocated to the other electronic musical apparatuses in the target session, d) notifies the requesting electronic musical apparatus of the allocated channel together with the identification data of the electronic musical apparatuses belonging to the target session and channels used by the electronic musical apparatuses belonging to the target session as the session information, and e) notifies each of the electronic musical apparatuses belonging to the target session other than the requesting electronic musical apparatus of the identification data of the requesting electronic musical apparatus, the channel allocated to the requesting electronic musical apparatus, and information on settings in a tone generator of the requesting electronic musical apparatus notified by the requesting electronic musical apparatus, as the session information;

wherein the plurality of electronic musical apparatuses control transmission/reception of the performance data to one another over/from the peer-to-peer network and sound generation in the tone generator based on the settings on parameters for the sound generation in the tone generator.

4. The communication management device of claim 3, wherein one of the plurality of the electronic musical apparatuses is the communication management device, such that the communication management device is a master node in the peer-to-peer network.

* * * * *